(12) United States Patent
Youn et al.

(10) Patent No.: US 11,128,795 B2
(45) Date of Patent: Sep. 21, 2021

(54) ELECTRONIC DEVICE FOR RECOMMENDING COMPOSITION AND OPERATING METHOD THEREOF

(71) Applicant: Samsung Electronics Co., Ltd., Suwon-si (KR)

(72) Inventors: Sungwook Youn, Suwon-si (KR); Seoyoung Lee, Suwon-si (KR); Sehoon Kim, Suwon-si (KR); Daiwoong Choi, Suwon-si (KR); Byungjun Son, Suwon-si (KR); Sungjoo Ahn, Suwon-si (KR); Yanggeun Oh, Suwon-si (KR); Taehwa Hong, Suwon-si (KR); Jiyoon Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/795,445

(22) Filed: Feb. 19, 2020

(65) Prior Publication Data

US 2020/0267313 A1 Aug. 20, 2020

(30) Foreign Application Priority Data

Feb. 19, 2019 (KR) .......................... 10-2019-0019561

(51) Int. Cl.
*H04N 5/232* (2006.01)
(52) U.S. Cl.
CPC ... *H04N 5/23222* (2013.01); *H04N 5/232945* (2018.08)
(58) Field of Classification Search
CPC ...................... H04N 5/23222; H04N 5/232945
See application file for complete search history.

(56) References Cited

U.S. PATENT DOCUMENTS 9,319,591 B2 * 4/2016 Matsutani .......... H04N 5/23222
2009/0278958 A1 * 11/2009 Bregman-Amitai .... G06T 11/60
348/231.99
(Continued)

FOREIGN PATENT DOCUMENTS

CN 107018330 A 8/2017
KR 10-1222928 B1 1/2013
(Continued)

OTHER PUBLICATIONS

International Search Report and Written Opinion of the International Searching Authority in connection with International Application No. PCT/KR2020/002244 dated Jun. 11, 2020, 8 pages.

*Primary Examiner* — Ahmed A Berhan

(57) ABSTRACT

An electronic device according to various embodiments may include: a display; an image sensor; and a processor configured to be operatively connected to the display and the image sensor. The processor may be configured to: display a first indicator at a specified position within a preview screen of the image sensor displayed on the display; identify a target on the preview screen; identify a target region corresponding to the identified target among a plurality of candidate target regions including the identified target on the basis of aesthetic scores assigned to the plurality of candidate target regions; display a second indicator corresponding to the identified target region on the preview screen; and when the second indicator is moved to the specified position, generate a photographic image corresponding to the preview screen at a specified time.

20 Claims, 19 Drawing Sheets

(56) References Cited

U.S. PATENT DOCUMENTS

2014/0368718 A1    12/2014   Matsutani et al.
2017/0155833 A1    6/2017   Rodrigo Cavalin et al.
2018/0189937 A1    7/2018   Bala et al.

FOREIGN PATENT DOCUMENTS

KR    10-2015-0008801 A    1/2015
KR    10-2015-0134960 A    12/2015

* cited by examiner

ELECTRONIC DEVICE FOR RECOMMENDING COMPOSITION AND OPERATING METHOD THEREOF

CROSS-REFERENCE TO RELATED APPLICATION

This application is based on and claims priority under 35 U.S.C. 119 to Korean Patent Application No. 10-2019-0019561 filed on Feb. 19, 2019 in the Korean Intellectual Property Office, the disclosure of which is herein incorporated by reference in its entirety.

BACKGROUND

1. Field

Various embodiments relate to an electronic device for recommending an optimal composition to a user while providing a preview screen of a camera for the user and an operating method thereof.

2. Description of Related Art

Portable electronic devices, such as a smartphone, can provide not only basic services, such as phone-calling and texting, but also various complex services, such as photography, multimedia playback, and financial services. In particular, portable electronic devices may capture various types of photographic images (e.g., a still image, a moving image, and a panoramic image) according to a user input. Portable electronic devices may provide a user with various pieces of additional information for guiding a user about photographing before taking a photographic image (e.g., to overlap on a preview screen).

The above information is presented as background information only to assist with an understanding of the disclosure. No determination has been made, and no assertion is made, as to whether any of the above might be applicable as prior art with regard to the disclosure.

SUMMARY

As an example of providing various pieces of additional information for guiding photographing, an electronic device may recommend a composition by detecting feature elements from an image included on a preview screen and differently arranging specific elements of the detected image or may provide a user interface to guide a movement of the center position of the preview screen to a target position. However, a known composition recommendation method may be used when the composition of a preview image corresponds to a specific composition (e.g., has similarity to a composition that is preset and stored within a reference range). Further, a known method of providing a guide user interface does not consider an actual photographing scenario and may thus operate differently from the actual intention of a user (e.g., provides or continues providing a guide actually not intended by the user).

An electronic device according to various embodiments may include: a display; an image sensor; and a processor configured to be operatively connected to the display and the image sensor, wherein the processor may be configured to: display a first indicator at a specified position within a preview screen of the image sensor displayed on the display; identify a target on the preview screen; identify a target region corresponding to the identified target among a plurality of candidate target regions including the identified target on the basis of aesthetic scores assigned to the plurality of candidate target regions; display a second indicator corresponding to the identified target region on the preview screen; and when the second indicator is moved to the specified position, generate a photographic image corresponding to the preview screen at a specified time.

An operating method of an electronic device including an image sensor and a display according to various embodiments may include: displaying a first indicator at a specified position within a preview screen of the image sensor displayed on the display; identifying a target on the preview screen; identifying a target region corresponding to the identified target among a plurality of candidate target regions including the identified target on the basis of aesthetic scores assigned to the plurality of candidate target regions; displaying a second indicator corresponding to the identified target region on the preview screen; and when the second indicator is moved to the specified position, generating a photographic image corresponding to the preview screen at a specified time.

An electronic device and an operating method thereof according to various embodiments may provide an optimal composition for a user even though an arrangement of objects included in a preview screen image does not correspond to a predesignated arrangement.

Further, an electronic device and an operating method thereof according to various embodiments may provide a guide appropriate for the intention of a user in each operation from framing a subject on a preview screen to actual photographing.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
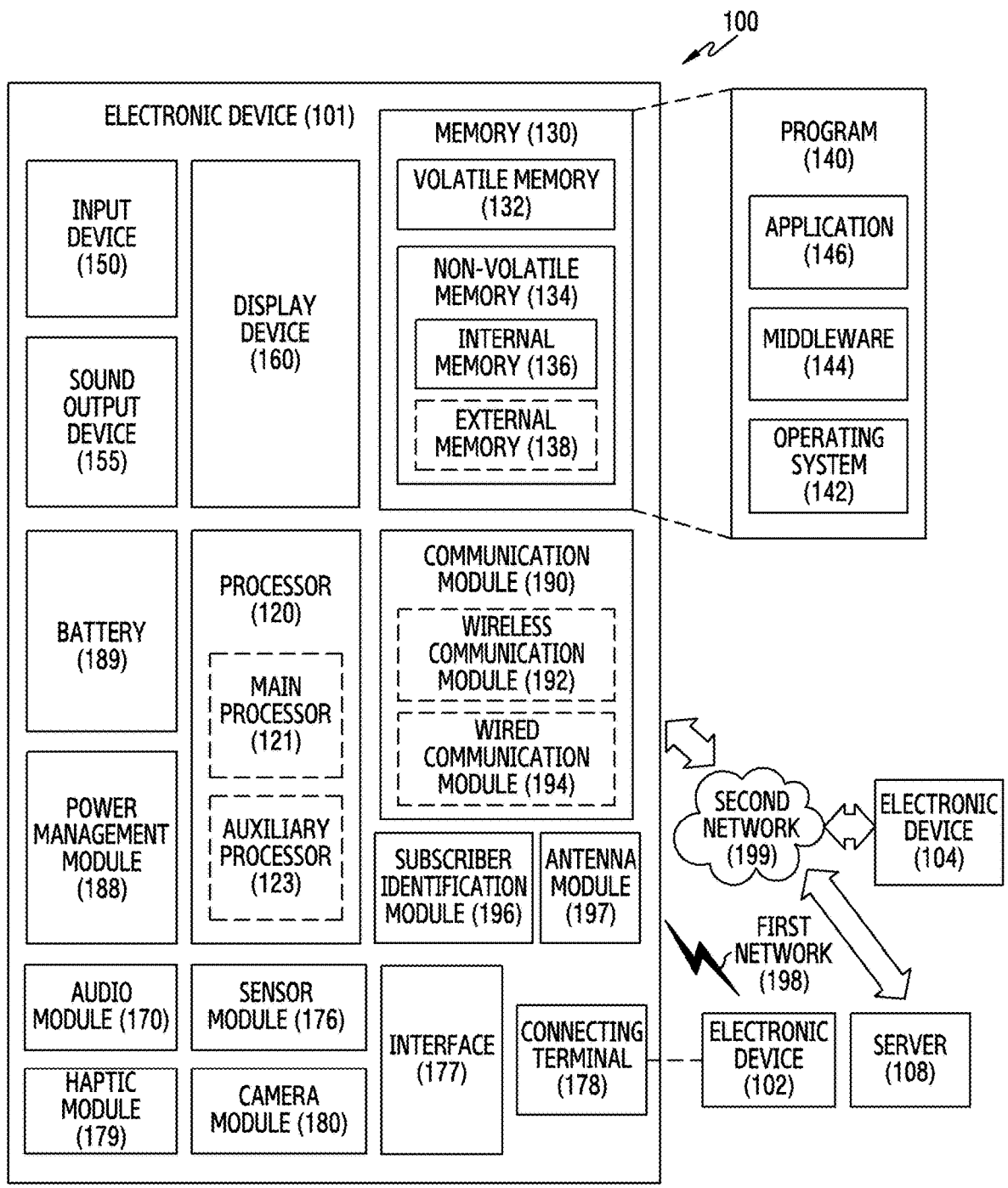
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other components (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
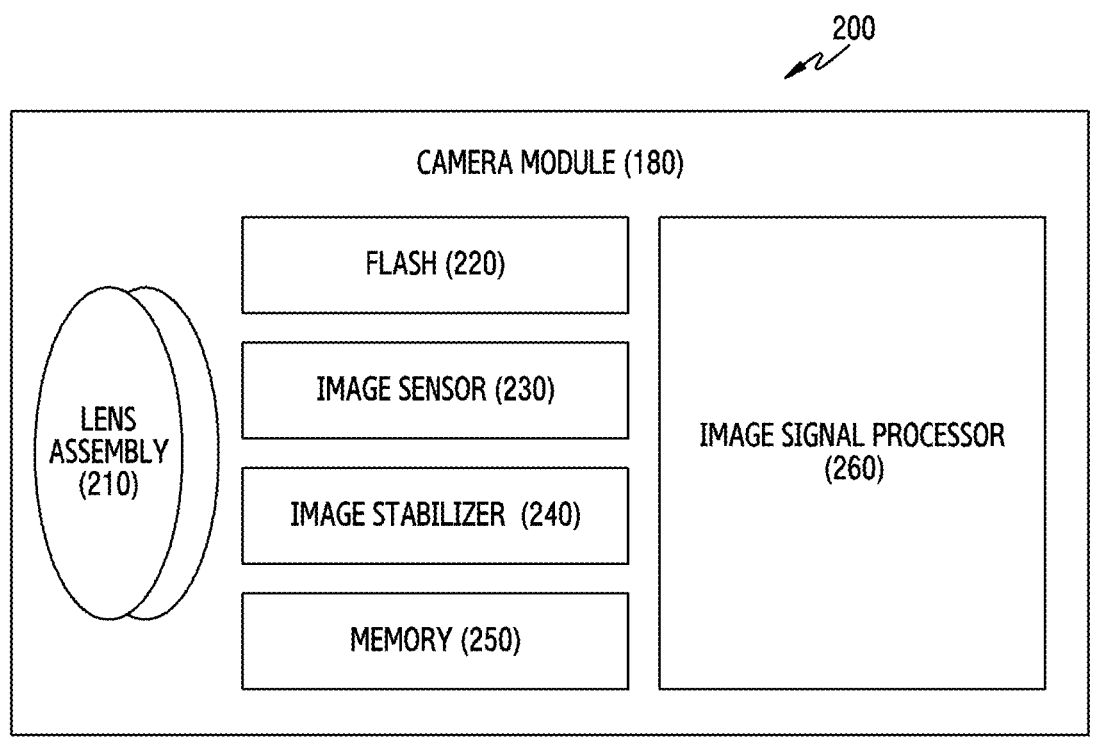
FIG. 2 is a block diagram illustrating a camera module according to various embodiments.

FIG. 2 is a block diagram 200 illustrating a camera module 180 according to various embodiments. Referring to FIG. 2, the camera module 180 may include a lens assembly 210, a flash 220, an image sensor 230, an image stabilizer 240, a memory 250 (e.g., a buffer memory), or an image signal processor 260. The lens assembly 210 may collect light emitted from a subject that is an object to be photographed. The lens assembly 210 may include one or more lenses. According to an embodiment, the camera module 180 may include a plurality of lens assemblies 210. In this case, the camera module 180 may form, for example, a dual camera, a 360-degree camera, or a spherical camera. Some of the plurality of lens assemblies 210 may have the same lens properties (e.g., view angle, focal length, autofocus, f-number, or optical zoom), or at least one lens assembly may have one or more lens properties different from those of another lens assembly. The lens assembly 210 may include, for example, a wide-angle lens or a telephoto lens.

The flash 220 may emit light used to intensify light emitted or reflected from a subject. According to an embodiment, the flash 220 may include one or more light-emitting diodes (e.g., a red-green-blue (RGB) LED, a white LED, an infrared LED, or an ultraviolet LED) or a xenon lamp. The image sensor 230 may convert light, emitted or reflected from a subject and transmitted through the lens assembly 210, into an electrical signal, thereby obtaining an image corresponding to the subject. According to an embodiment, the image sensor 230 may include one image sensor selected from among image sensors having different properties, for example, an RGB sensor, a black and white (BW) sensor, an IR sensor, or a UV sensor, a plurality of image sensors having the same properties, or a plurality of image sensors having different properties. Each image sensor included in the image sensor 230 may be configured, for example, using a charge-coupled device (CCD) sensor or a complementary metal-oxide semiconductor (CMOS) sensor.

The image stabilizer 240 may move at least one lens included in the lens assembly 210 or the image sensor 230 in a particular direction or may control an operational characteristic of the image sensor 230 (e.g., adjust read-out timing) in response to the movement of the camera module 180 or the electronic device 101 including the same, thus compensating for at least part of the negative impact of the movement on a captured image. According to an embodiment, the image stabilizer 240 may detect the movement of the camera module 180 or the electronic device 101 using a gyro sensor or an acceleration sensor disposed inside or outside the camera module 180. According to an embodiment, the image stabilizer 240 may be configured, for example, as an optical image stabilizer. The memory 250 may at least temporarily store at least a portion of an image obtained via the image sensor 230 for a subsequent image processing operation. For example, when obtaining an image is delayed due to a shutter or a plurality of images is obtained at a high speed, an obtained original image (e.g., a Bayer-patterned image or high-resolution image) is stored in the memory 250, and a corresponding duplicate image (e.g., a low-resolution image) may be previewed through a display device 160. Subsequently, when a specified condition is satisfied (e.g., according to a user input or a system command), at least a portion of the original image stored in the memory 250 may be obtained and processed, for example, by the image signal processor 260. According to an embodiment, the memory 250 may be configured as at least a part of the memory 130 or as a separate memory operating independently of the memory 130.

The image signal processor 260 may perform one or more types of image processing on an image obtained through the image sensor 230 or an image stored in the memory 250. The one or more types of image processing may include, for example, depth map generation, three-dimensional modeling, panorama generation, feature point extraction, image synthesis, or image calibration (e.g., noise reduction, resolution adjustment, brightness adjustment, blurring, sharpening, or softening). Additionally or alternatively, the image signal processor 260 may control at least one (e.g., the image sensor 230) of components included in the camera module 180 (e.g., exposure time control or read-out timing control). An image processed by the image signal processor 260 may be stored back in the memory 250 for further processing or may be provided to a component (e.g., the memory 130, the display device 160, the electronic device 102, the electronic device 104, or the server 108) outside the camera module 180. According to an embodiment, the image signal processor 260 may be configured as at least a part of the processor 120 or as a separate processor operating independently of the processor 120. When the image signal processor 260 is configured as a separate processor from the processor 120, at least one image processed by the image signal processor 260 may be displayed on the display device 160 as it is or after additional image processing by the processor 120.

According to an embodiment, the electronic device 101 may include a plurality of camera modules 180 respectively having different properties or functions. In this case, for example, at least one of the plurality of camera modules 180 may be a wide-angle camera, and at least another may be a telephoto camera. Likewise, at least one of the plurality of camera modules 180 may be a front camera, and at least another may be a rear camera.

Figure 3:
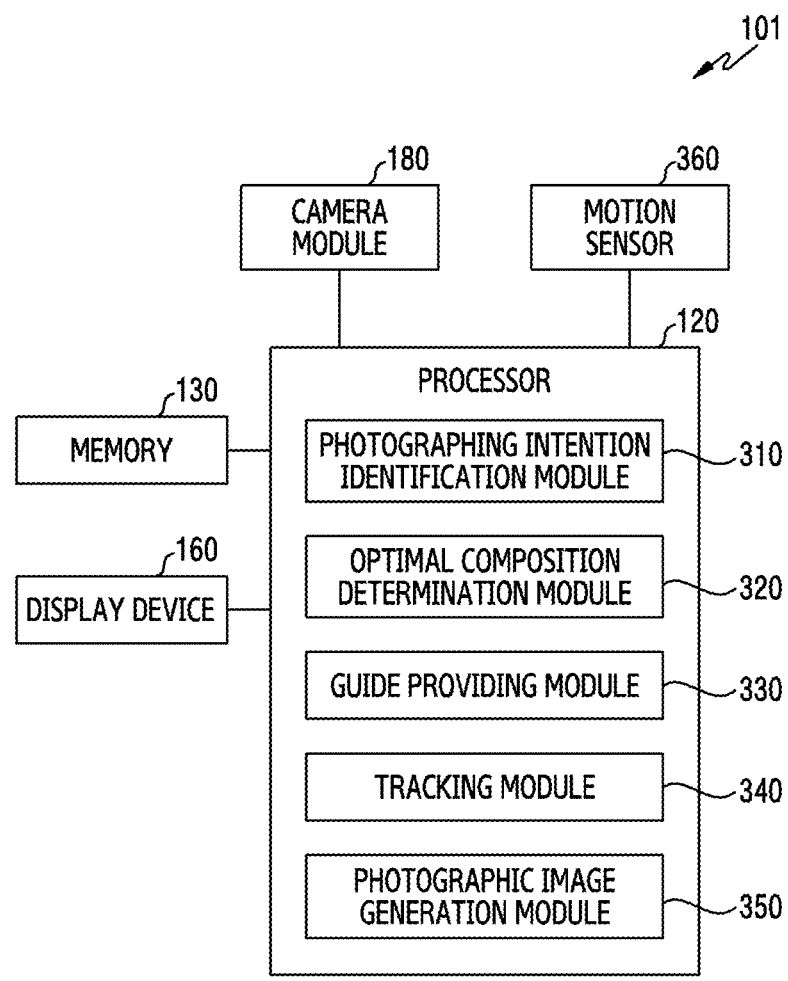
FIG. 3 is a block diagram illustrating an electronic device according to various embodiments.

FIG. 3 is a block diagram illustrating an electronic device according to various embodiments.

Referring to FIG. 3, the electronic device 101 may include a processor 120, a memory 130, a display device 160, a camera module 180, and a motion sensor 360.

In an embodiment, the memory 130 may store an instruction (or a set of instructions or an application) for implementing various embodiments. In an embodiment, the memory 130 may store threshold value information for implementing various embodiments. In an embodiment, the memory 130 may store information about a statistical model or a statistical engine (e.g., a machine-learning model) for implementing various embodiments.

In an embodiment, the display device 160 may display a preview screen of the camera module 180 (or an image sensor). The display device 160 may display the preview screen on the basis of a plurality of image frames obtained from the camera module 180. The preview screen displayed on the display device 160 may be periodically updated. In an embodiment, the display device 160 may display various user interfaces (e.g., an indicator) for recommending a composition to overlap the preview screen. For example, the display device 160 may display an indicator indicating a particular position of the preview screen or a specified position (e.g., the center of the preview screen) to overlap the preview screen.

In an embodiment, the camera module 180 may obtain a plurality of image frames. The plurality of obtained image frames may be used to update a preview screen or to generate a photographic image.

In an embodiment, the motion sensor 360 may obtain sensing data related to the movement of the electronic device 101. The motion sensor 360 may correspond to the sensor module 176 illustrated in FIG. 1. For example, the motion sensor 360 may obtain sensing data related to a movement of the electronic device 101. In another example, the motion sensor 360 may obtain sensing data related to the rotation or tilting of the electronic device 101.

In an embodiment, the processor 120 may include a photographing intention identification module 310, an optimal composition determination module 320, a guide providing module 330, a tracking module 340, and a photographic image generation module 350. The processor 120 may load a command or data to perform at least one function or operation specified in each of the photographing intention identification module 310, the optimal composition determination module 320, the guide providing module 330, the tracking module 340, and the photographic image generation module 350 into the memory 130 (e.g., the volatile memory 132) and may process the loaded command or data. The processor 120 may be operatively or electrically connected to the memory 130, the display device 160, the camera module 180, and the motion sensor 360 to exchange data or signals.

In an embodiment, the photographing intention identification module 310 may identify the photographing intention of a user. In an embodiment, the photographing intention may correspond to a user intention of obtaining an image displayed on a current preview screen as a photographic image, that is, a user intention just before pressing a photographing icon.

In an embodiment, the photographing intention identification module 310 may operate after executing a camera application installed in the electronic device 101 (and activating the camera module 180). For example, the photographing intention identification module 310 may operate when the preview screen of the camera module 180 is displayed on the display device 160.

In an embodiment, the photographing intention identification module 310 may check whether the electronic device 101 is in a stable situation in order to identify the photographing intention. To check whether the electronic device 101 is in the stable situation, the photographing intention identification module 310 may use a plurality of image frames obtained through the camera module 180 or sensing information obtained through the motion sensor 360.

In an embodiment, the photographing intention identification module 310 may identify the photographing intention of the user on the basis of information (e.g., autofocus information) about a plurality of image frames obtained through the camera module 180. For example, the photographing intention identification module 310 may determine whether the number of consecutive frames that are autofocused among the plurality of image frames obtained through the camera module 180 is a first threshold value or greater. In an embodiment, the photographing intention identification module 310 may determine whether the number of consecutive frames having a brightness difference of a second threshold value or less is a third threshold value or greater.

In an embodiment, the photographing intention identification module 310 may identify the photographing intention of the user on the basis of sensing information related to the movement of the electronic device 101 (e.g., sensing information of the acceleration sensor). For example, the photographing intention identification module 310 may determine whether sensing information related to the movement of the electronic device 101 from the motion sensor 360 is maintained at a fourth threshold value or less for a time of a fifth threshold value.

In an embodiment, the photographing intention identification module 310 may identify the photographing intention of the user on the basis of both the information about the plurality of image frames obtained through the camera module 180 and the sensing information related to the movement of the electronic device 101.

In an embodiment, the optimal composition determination module 320 may determine an optimal composition for at least one object included in the preview screen. In an embodiment, the optimal composition determination module 320 may change a criterion used to determine an optimal composition according to the type of at least one object included in the preview screen. For example, when there is one human face on the preview screen, the optimal composition determination module 320 may determine an optimal composition on the basis of the human face. In another example, when there is one whole human body on the preview screen, the optimal composition determination module 320 may determine an optimal composition on the basis of the whole human body. In still another example, when the preview screen does not include a human or includes two or more human bodies, the optimal composition determination module 320 may determine an optimal composition on the basis of aesthetics score assigned to a plurality of regions. In yet another example, when it is determined that an optimal composition based on aesthetic scores assigned to a plurality of regions is inappropriate, the optimal composition determination module 320 may determine an optimal composition on the basis of a predetermined policy or rule.

In an embodiment, the guide providing module 330 may control the display device 160 to display a user interface (e.g., an indicator) for guiding the user on photographing (or for providing a recommended composition) to the user. For example, the guide providing module 330 may control the display device 160 to display an indicator (e.g., a second indicator) corresponding to a specific object displayed on the preview screen. When the specific object is no longer displayed on the preview screen, the guide providing module 330 may control the display device 160 to no longer display the indicator corresponding to the specific object. In another example, the guide providing module 330 may control the display device 160 to display an indicator (e.g., a first indicator) indicating a specified position of the preview screen.

In an embodiment, in displaying the indicator (e.g., the second indicator) corresponding to the specific object displayed on the preview screen, the guide providing module 330 may change the position of the displayed indicator (e.g., the second indicator) according to a movement of the position of the specific object displayed on the preview screen. For example, the position of the specific object displayed on the preview screen may be changed according to a movement of the electronic device 101 or the camera module 180 or a movement of a real object corresponding to the specific object, and the guide providing module may change the position of the displayed indicator (e.g., the second indicator) according to the changed displayed position.

In an embodiment, the guide providing module 330 may display a message, such as "best shot" or "best composition", under the second indicator in order to clearly deliver the meaning of the second indicator while displaying the second indicator.

In an embodiment, the guide providing module 330 may change a display characteristic of at least one of the first indicator and the second indicator. For example, the guide providing module 330 may change a display characteristic of the second indicator according to the change in the position of the displayed second indicator. Specifically, as the second indicator gets closer to the first indicator, the second indicator may be more highlighted than before (e.g., by changing a color or by increasing brightness or transparency). In another example, when it is necessary to analyze a newly recommended composition (e.g., when a significant change in the preview screen is detected or when a movement of the electronic device 101 is detected to an extent of a specified value or higher), the guide providing module 330 may change at least one display characteristic of the first indicator or the second indicator (e.g., whether to display, a display form, a color, and an animation effect). In still another example, when the first indicator or the second indicator overlaps a human face or main subjects included in the preview screen, the guide providing module 330 may change the transparency or density of the overlapping indicator or may change the position of the displayed overlapping indicator.

In an embodiment, the tracking module 340 may track the indicator (e.g., the second indicator) corresponding to the specific object displayed on the preview screen or whether the indicator is moved to a specified position of the screen. In an embodiment, the tracking module 340 may track whether the indicator is moved to the specified position of the screen by updating the position of the indicator corresponding to the specific object every image frame obtained from the camera module 180. In an embodiment, the tracking module 340 may track the indicator using a predetermined tracking algorithm. In an embodiment, the tracking module 340 may also track the indicator using a face region of interest. For example, the tracking module may track the indicator using the face region of interest in providing a face position-based recommended composition in operation 630 of FIG. 6.

In an embodiment, the photographic image generation module 350 may generate a photographic image.

The photographic image generation module 350 may generate a photographic image corresponding to a specific time. The photographic image generation module 350 may generate a photographic image corresponding to a preview screen at a specific time point. The photographic image generation module 350 may generate a photographic image having a higher quality (e.g., a higher resolution) than that of the preview screen.

In an embodiment, the photographic image generation module 350 may generate a photographic image on the basis of a user input, and may generate a photographic image even without any user input when a condition related to an indicator displayed on a preview screen and/or a specific condition related to a horizontal state (or tilting state) of the electronic device 101 is satisfied.

Figure 9A:
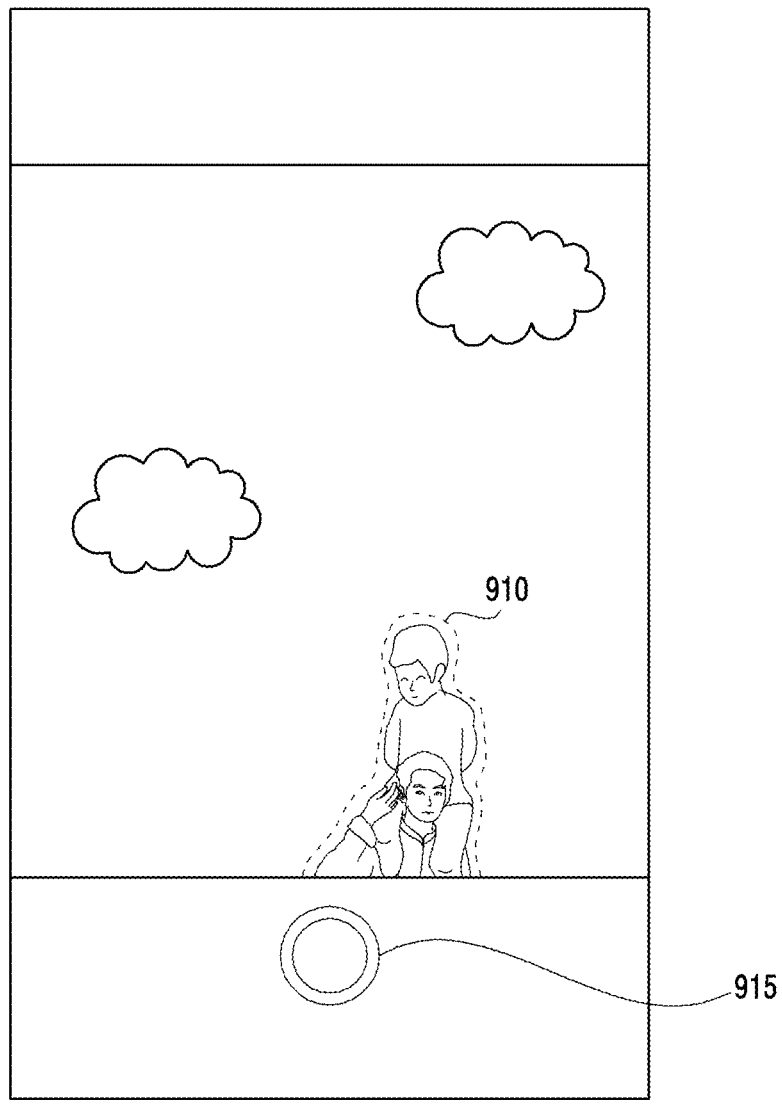
FIG. 9A illustrates an operation of an electronic device identifying a target region.

For example, the photographic image generation module 350 may generate a photographic image on the basis of a user input (or in response to the user input) via an icon for photographing or capturing (e.g., a shutter button 915 of FIG. 9A).

In another example, when at least a portion of the second indicator corresponding to the specific object displayed on the preview screen overlaps at least a portion of the first indicator indicating the specified position of the preview screen, the photographic image generation module 350 may generate a photographic image corresponding to a time when the indicators overlap even though there is no user input via the icon for photographing or capturing.

In still another example, when at least a portion of the second indicator corresponding to the specific object displayed on the preview screen overlaps at least a portion of the first indicator indicating the specified position of the preview screen and the angle of the electronic device 101 tilted from a reference axis (e.g., the vertical axis or z-axis) in a reference direction (e.g., the y-axis) is within a specified range (e.g., from −3 degrees to +3 degrees), the photographic image generation module 350 may generate a photographic image corresponding to a time when the indicators overlap or the angle of the tilted electronic device 101 enters the specified range even though there is no user input via the icon for photographing or capturing.

Figure 4:
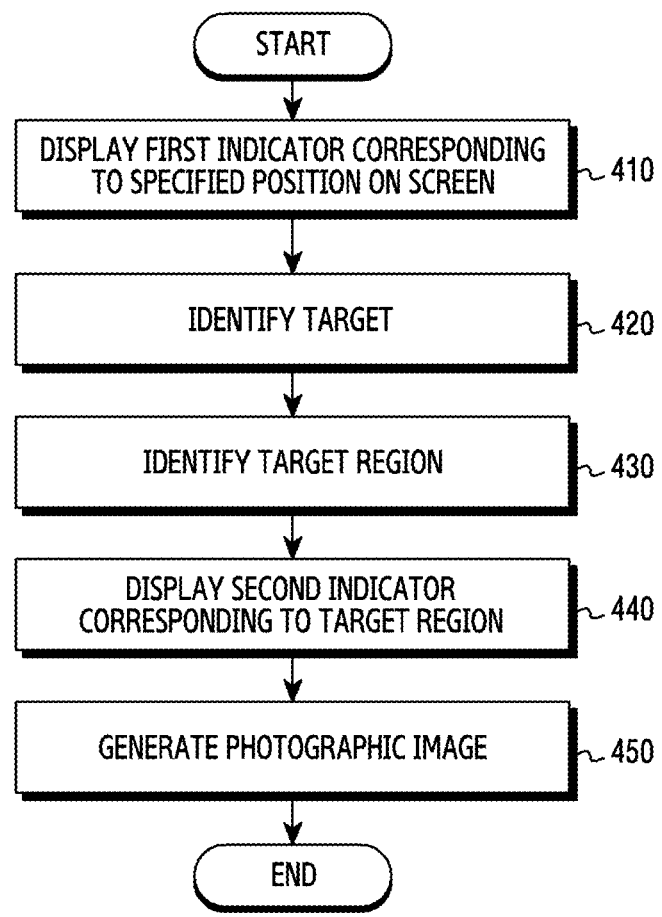
FIG. 4 is a flowchart illustrating an operation of an electronic device according to various embodiments.

FIG. 4 is a flowchart illustrating an operation of an electronic device according to various embodiments.

At least one operation illustrated in FIG. 4 may be performed by the electronic device 101 or a processor 120.

In an embodiment, the processor 120 may display a first indicator corresponding to a specified position of a preview screen in operation 410. Hereinafter, a display operation of the processor may represent an operation of the processor 120 controlling a display device 160. For example, the processor 120 may control the display device 160 to display the first indicator corresponding to the specified position of the preview screen. The display device 160 may display the first indicator at the center of the preview screen. In an embodiment, the first indicator may be fixed at the specified position (e.g., the center) of the preview screen regardless of a movement of the electronic device 101.

In an embodiment, the processor 120 may identify a target in operation 420. The processor 120 may identify the target included in the preview screen displayed on the display device 160. The processor 120 may identify the target among a plurality of objects included in the preview screen. The identified target may be one of the plurality of objects included in the preview screen or a combination of two or more objects.

For example, referring to FIG. 9A, the processor 120 may identify a target 910 included in a preview screen.

In an embodiment, the processor 120 may identify the target among the plurality of objects on the basis of at least one of an area occupied in the preview screen, a color, a type (or priority assigned to a plurality of types), and geometric characteristics. For example, the processor 120 may identify the target on the basis of an object occupying the largest area in the preview screen among the plurality of objects. In another example, the processor 120 may identify the target among the plurality of objects on the basis of an object that is most significantly different in color from another object (or background). In still another example, the processor 120 may identify the target on the basis of an object of a type having the highest priority (e.g., a human) among the plurality of objects.

In an embodiment, the processor 120 may identify a target region in operation 430. The processor 120 may identify one target region among a plurality of candidate target regions including the identified target. For example, the processor 120 may assign scores calculated according to a predetermined criterion to the plurality of candidate target regions and may identify one target region on the basis of the assigned scores.

In this case, the processor 120 may display the first indicator together with a visual effect of flickering while identifying the target region or while identifying the target, and may restrict the visual effect of flickering when the target region is completely identified.

In an embodiment, the processor 120 may display a second indicator corresponding to the target region in operation 440. For example, the display device 160 may display the second indicator at the center of the target region identified in operation 430. In an embodiment, the position of the displayed second indicator may be changed on the preview screen according to a movement of the electronic device 101. For example, when the electronic device 101 moves to the right, the position of the displayed second indicator may be moved to the left on the preview screen.

Figure 11A:
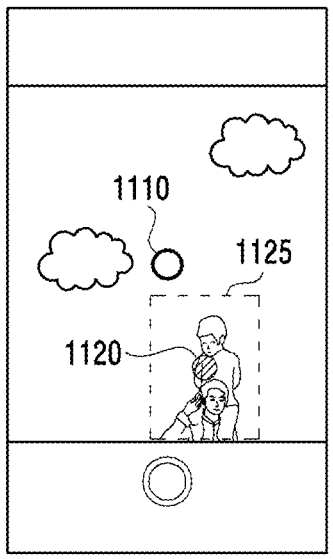
FIG. 11A illustrates an operation of an electronic device generating a photographic image according to various embodiments.

For example, referring to FIG. 11A, the processor 120 may display a second indicator 1120 corresponding to a target region 1125 and a first indicator 1110 corresponding to a specified position of a preview screen. The electronic device 101 may display the first indicator 1110 and the second indicator 1120, thereby guiding the second indicator 1120 to move to the specified position 1110 of the screen.

In an embodiment, the processor 120 may display the second indicator to be positioned on the same reference line (reference vertical line, horizontal left reference line, or diagonal line) as the first indicator. In an embodiment, the processor 120 may identify the type of an object included in the preview screen, and may display the second indicator to be positioned on the same reference line as the first indicator when the type of the identified object satisfies a predetermined condition. For example, when a sky is identified on the preview screen, the processor 120 may display the second indicator to be positioned on a horizontal reference line that divides the preview screen into two parts up and down. In this case, the processor 120 may guide the second indicator to move along the horizontal reference line, and may reduce the size of the second indicator or may provide a notification of a specified effect (e.g., a vibration effect) to a user when the second indicator is moved in the vertical direction. When a human whole body is identified on the preview screen, the processor 120 may display the second indicator to be positioned on a horizontal reference line that divides the preview screen into two parts up and down, in which case the second indicator may be guided to move along the horizontal reference line. The reason why the second indicator is guided to move along the horizontal reference line is that the display of the face or the foot of an identified person is likely to be restricted on the preview screen when the second indicator is moved in the vertical direction.

Figure 7:
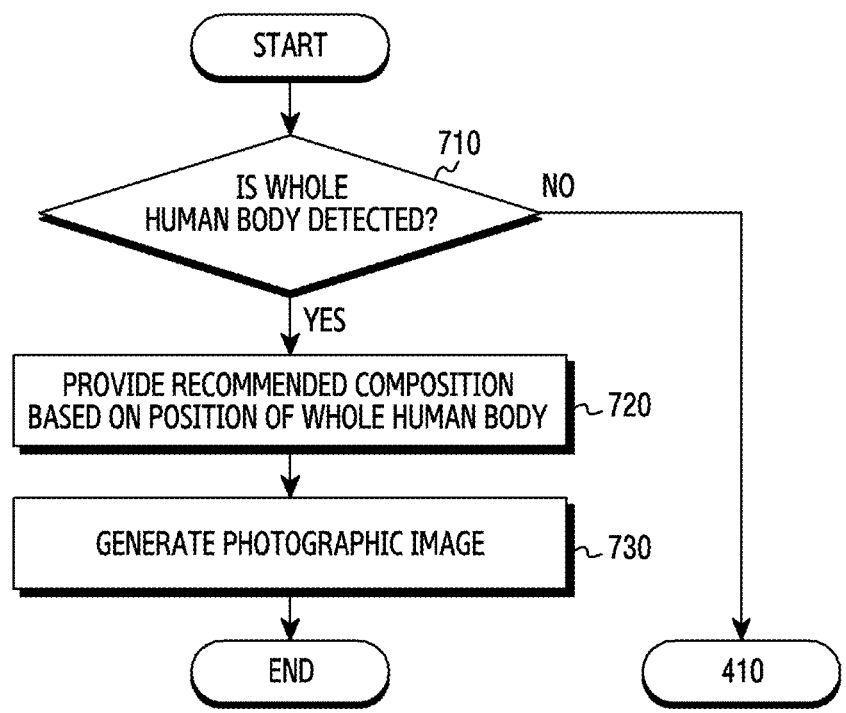
FIG. 7 is a flowchart illustrating an operation of an electronic device providing a whole human body position-based recommended composition according to various embodiments.

In an embodiment, in identifying the type of an object included in a preview screen, the processor 120 may utilize an object detection model based on machine learning, and the object detection model is used in operation 440 or operation 710 of FIG. 7.

The processor 120 may display the first indicator and the second indicator upon identifying the target region.

In an embodiment, the processor 120 may generate a photographic image in operation 450.

In an embodiment, the processor 120 may generate a photographic image on the basis of a user input via an icon for photographing or capturing. When at least a portion of the first indicator displayed on the display device 160 overlaps at least a portion of the second indicator, the processor 120 may display a third indicator for proposing or guiding the user to take a picture with a current composition, and may generate the photographic image on the basis of a user input via the icon for photographing or capturing after displaying the third indicator.

In another embodiment, even though there is no user input via the icon for photographing or capturing, the processor 120 may generate a photographic image when a condition related to an indicator displayed on the preview screen is satisfied. For example, when at least a portion of the first indicator displayed on the display device 160 overlaps at least a portion of the second indicator, even though there is no user input via the icon for photographing or capturing, the processor 120 may generate a photographic image on the basis of a time when at least the portion of the first indicator overlaps at least the portion of the second indicator. In another example, when at least a portion of the first indicator overlaps at least a portion of the second indicator, the processor 120 may check different conditions (e.g., an autofocus, the average brightness of a preview screen, and the like) related to a camera necessary to identify photographing and may generate a photographic image according to the result of checking. For example, when the autofocus and the average brightness of the preview screen satisfy specified conditions, the processor 120 may generate a photographic image on the basis of a time when at least the portion of the first indicator overlaps at least the portion of the second indicator or a time when these conditions are checked. In another example, when at least one of the autofocus and the average brightness of the preview screen does not satisfy a specified condition, the processor 120 may not generate a photographic image, or may automatically change a camera setting in order to satisfy the specified condition and may then generate a photographic image on the basis of a time when the camera setting is changed.

In an embodiment, the processor 120 may output a message indicating to the user that a photographic image is to be generated before generating the photographic image. For example, when at least a portion of the first indicator overlaps at least a portion of the second indicator, the processor 120 may display a message indicating that the current composition is an optimal composition.

In an embodiment, the processor 120 may restrict the display of the first indicator, the second indicator, or the third indicator (to be described in FIG. 10) after generating the photographic image.

Figure 5:
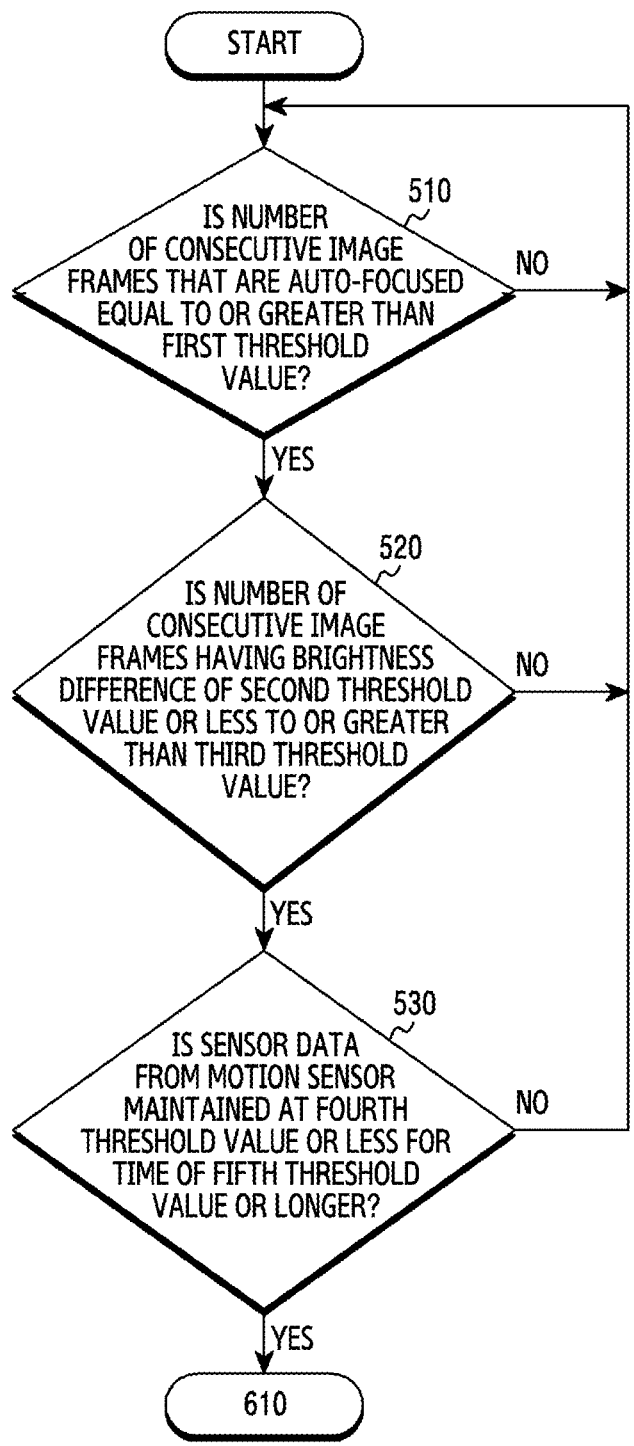
FIG. 5 is a flowchart illustrating an operation of an electronic device identifying the photographing intention of a user according to various embodiments.

FIG. 5 is a flowchart illustrating an operation of an electronic device identifying the photographing intention of a user according to various embodiments.

In an embodiment, at least one operation illustrated in FIG. 5 may be performed before operation 410 is performed.

In an embodiment, in operation 510, the processor 120 may identify whether the number of consecutive image frames that are auto-focused is a first threshold value or greater. The processor 120 may identify whether the number of consecutive image frames that are auto-focused among a plurality of image frames obtained by the camera module 180 is the first threshold value or greater. In an embodiment, since the photographing intention indicates a user's intention to obtain an image displayed on a current preview screen as a photographic image, it is desirable to preferentially identify whether auto-focused image frames are consecutively obtained.

In an embodiment, the processor 120 may also identify whether auto-focused image frames are consecutively obtained for a time of the first threshold value or longer.

When the number of consecutive image frames that are auto-focused is the first threshold value or greater (Yes in operation 510), the processor 120 may perform operation 520. When the number of consecutive image frames that are auto-focused is less than the first threshold value (No in operation 510), the processor 120 may repeat operation 510 again.

In an embodiment, in operation 520, the processor 120 may identify whether the number of consecutive image frames having a brightness difference of a second threshold value or less is a third threshold value or greater. The processor 120 may use average brightness information about the preview screen (or an image frame corresponding to the preview screen). In an embodiment, the processor 120 may perform operation 520 on the consecutive auto-focused mage frames that are identified in operation 510, and may perform operation 520 on image frames obtained after the image frames identified in operation 510.

When the number of consecutive image frames having a brightness difference of the second threshold value or less is the third threshold value or greater (Yes in operation 520), the processor 120 may perform operation 530. When the number of consecutive image frames having a brightness difference of the second threshold value or less is less than the third threshold value (No in operation 520), the processor 120 may repeat operation 510.

In an embodiment, in operation 530, the processor 120 may identify whether sensor data from a motion sensor (e.g., the motion sensor 360 of FIG. 3) is maintained at a fourth threshold value or less for a time of a fifth threshold value or longer. In an embodiment, the sensor data from the motion sensor may be sensor data (e.g., acceleration sensor data) indicating the amount of movement of the electronic device 101.

When the sensor data from the motion sensor is maintained at the fourth threshold value or less for the time of the fifth threshold value or longer, the processor 120 may perform operation 610. When the sensor data from the motion sensor is not maintained at the fourth threshold value or less for the time of the fifth threshold value or longer, the processor 120 may repeat operation 510.

Through the embodiment disclosed in FIG. 5, the processor 120 may identify whether the electronic device 101 is maintained in a stable state for a specified time. During the specified time, consecutive image frames that are auto-focused are obtained, the average brightness difference between the obtained image frames may be the second threshold value or less, and sensor data from the motion sensor may be maintained at the fourth threshold value or lower.

Figure 6:
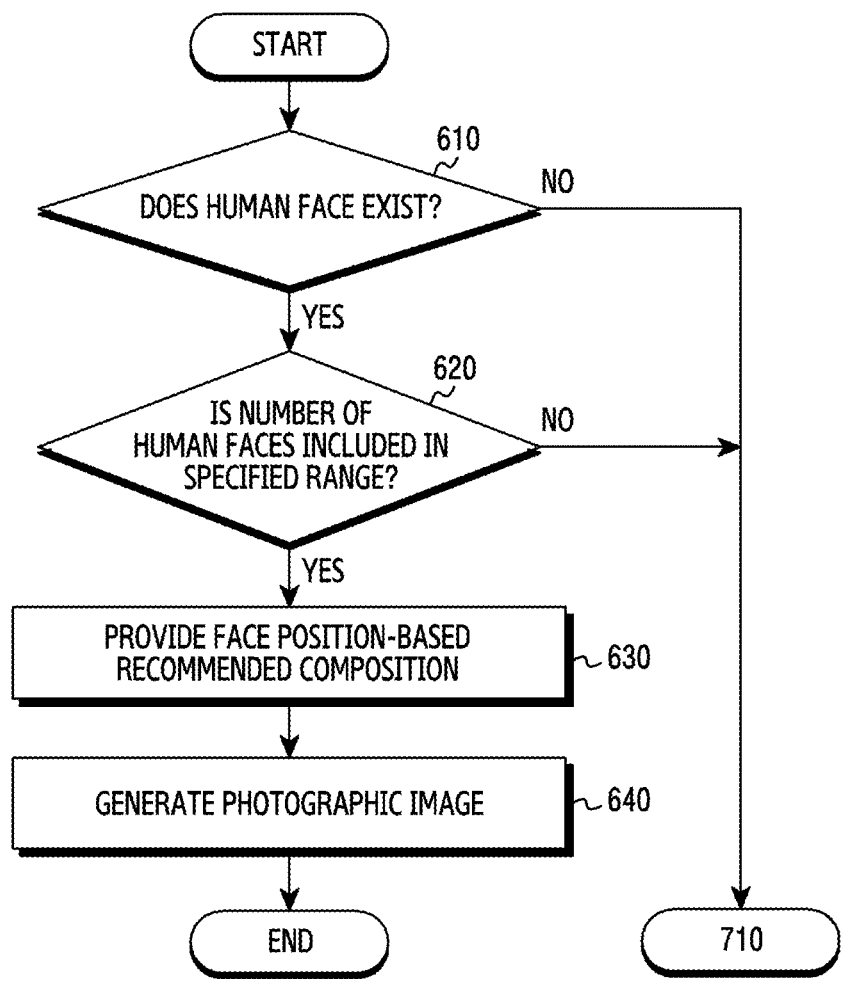
FIG. 6 is a flowchart illustrating an operation of an electronic device providing a face position-based recommended composition according to various embodiments.

FIG. 6 is a flowchart illustrating an operation of an electronic device providing a face position-based recommended composition according to various embodiments.

In an embodiment, at least one operation illustrated in FIG. 6 may be performed after at least one operation illustrated in FIG. 5 is performed and before operation 410 of FIG. 4 is performed.

In an embodiment, the processor 120 may identify whether a human face exists in a preview screen in operation 610. In an embodiment, the processor 120 may identify whether a human face exists among a plurality of objects included in a preview screen on the basis of at least one of an outline shape, a color, and an arrangement of characteristic elements (e.g., eyes, nose, mouth, and the like). In another embodiment, the processor 120 may identify whether a human face exists in a preview screen by inputting a preview screen image into a statistical model trained on the basis of machine learning.

When there is no human face in the preview screen (No in operation 610), the processor 120 may perform operation 710. When there is a human face in the preview screen (Yes in operation 610), the processor 120 may perform operation 620.

In an embodiment, the processor 120 may identify whether the number of human faces is included within a specified range in operation 620. The processor 120 may identify whether the number of human faces identified in operation 610 is included in the specified range. For example, the specified range may be from 1 to 3.

When the number of human faces is not included in the specified range, the processor 120 may perform operation 710.

When the number of human faces is included in the specified range, the processor 120 may provide a face position-based recommended composition in operation 630. The processor 120 may provide a recommended composition for positioning a human face or human faces at a specified position of the preview screen. The processor 120 may determine the specified position of the preview screen on the basis of the size of a human face. When there is one human face, the processor 120 may determine the specified position of the preview screen on the basis of the direction that the face is looking. For example, when the human face is looking to the left, the processor 120 may provide a recommended composition for positioning the human face in a right region of the preview screen.

In an embodiment, in providing a recommended composition, the processor 120 may display an arrow or a recommended movement trajectory on the preview screen.

In an embodiment, the processor 120 may generate a photographic image in operation 640. For example, the processor 120 may provide a recommended composition on the basis of a face position and may then generate a photographic image in response to a user input to move the electronic device 101 according to the provided recommended composition. In another example, the processor 120 may generate a photographic image in response to a user input to move the electronic device 101 according to a provided recommended composition and a user input via an icon for photographing or capturing.

FIG. 7 is a flowchart illustrating an operation of an electronic device providing a whole human body position-based recommended composition according to various embodiments.

In an embodiment, at least one operation illustrated in FIG. 7 may be performed after at least one operation illustrated in FIG. 6 is performed and before operation 410 of FIG. 4 is performed.

In an embodiment, the processor 120 may identify whether a whole human body is detected in operation 710. In an embodiment, when there is no human face in a preview screen or the number of human faces in the in preview screen is not included in a specified range (e.g., from 1 to 3), the processor 120 may identify whether a whole human body is detected in the preview screen. In identifying whether a whole human body is detected, the processor 120 may utilize an object detection model (or an object detection engine) based on machine learning. The processor 120 may provide a recommended composition according to the result of detection using the object detection model based on the machine learning. Even though a whole human body is not detected, it is possible to provide a recommended composition specialized for a detected object according to the type of the detected object through the object detection model based on machine learning.

In an embodiment, the processor 120 may also identify whether a whole human body having a specified size or greater is detected. The processor 120 may perform operation 720 when a whole human body having a specified size or greater is detected. The processor 120 may identify whether a whole human body having a specified size or greater is detected, thereby identifying whether a main subject on the preview screen is a whole human body.

In an embodiment, the processor 120 may provide a recommended composition based on the position of a whole human body in operation 720. The processor 120 may provide a recommended composition for positioning the whole human body at a specified position of the preview screen. The processor 120 may determine the specified position of the preview screen on the basis of the size of the whole human body and the number of people.

In an embodiment, the processor 120 may calibrate the provided recommended composition. For example, the processor 120 may calibrate the provided recommended composition in order to position the whole human body at the specified position of the preview screen so that a human head, hands, or feet are not out of the screen.

In an embodiment, the processor 120 may omit or bypass providing the recommended composition or calibrating the provided recommended composition according to the type of an object detected through the object detection model based on machine learning.

In an embodiment, the processor 120 may generate a photographic image in operation 730. For example, the processor 120 may provide a recommended composition on the basis of the position of a human whole body and may then generate a photographic image in response to a user input to move the electronic device 101 according to the provided recommended composition.

Figure 8:
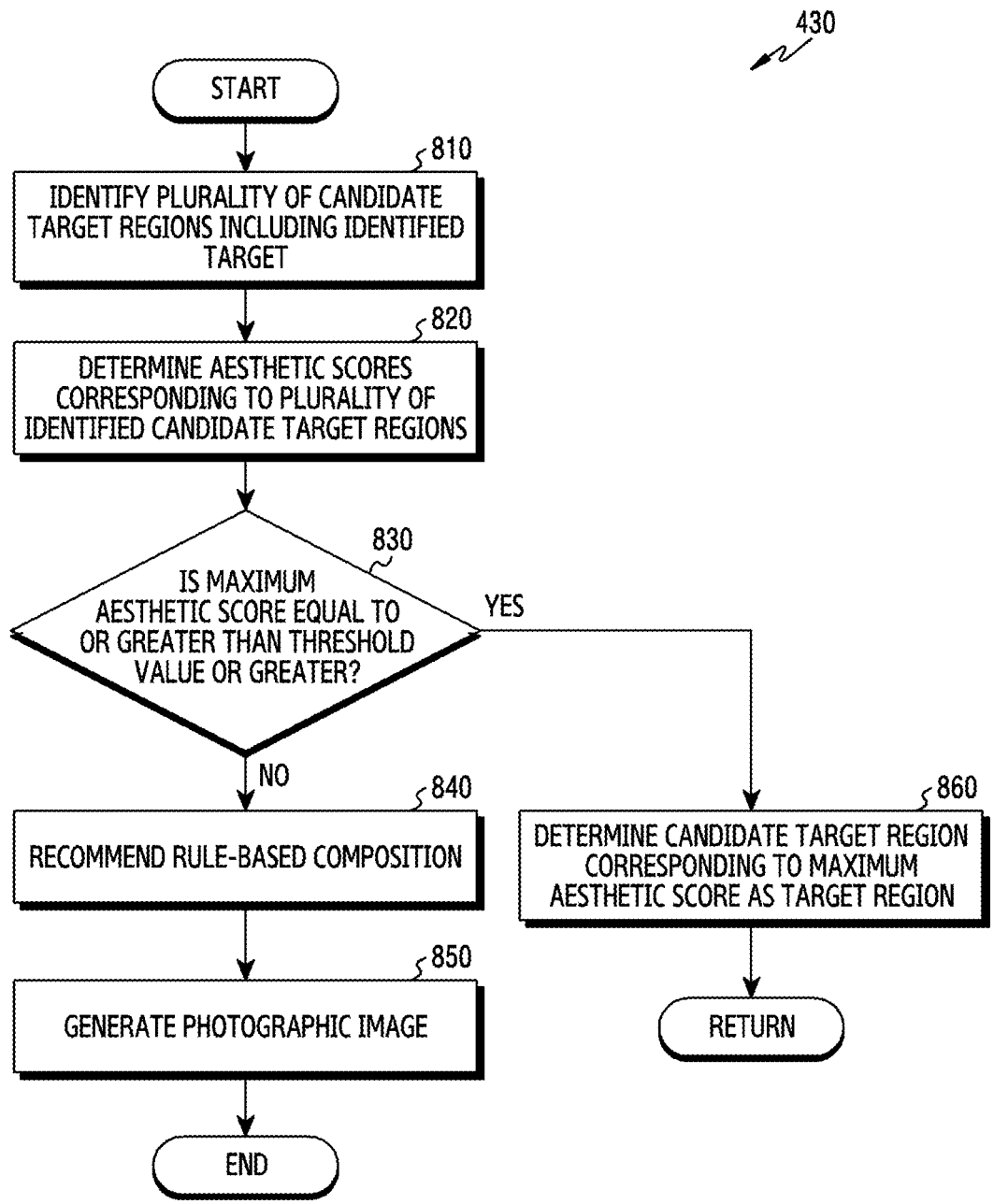
FIG. 8 is a flowchart illustrating an operation of an electronic device identifying a target region according to various embodiments.

FIG. 8 is a flowchart illustrating an operation of an electronic device identifying a target region according to various embodiments.

In an embodiment, at least one operation illustrated in FIG. 8 may be a detailed flowchart of operation 430 of FIG. 4.

In an embodiment, the processor 120 may identify a plurality of candidate target regions including an identified target in operation 810. The processor 120 may identify a plurality of cropped regions of a preview screen including the identified target as a plurality of candidate target regions.

Figure 9B:
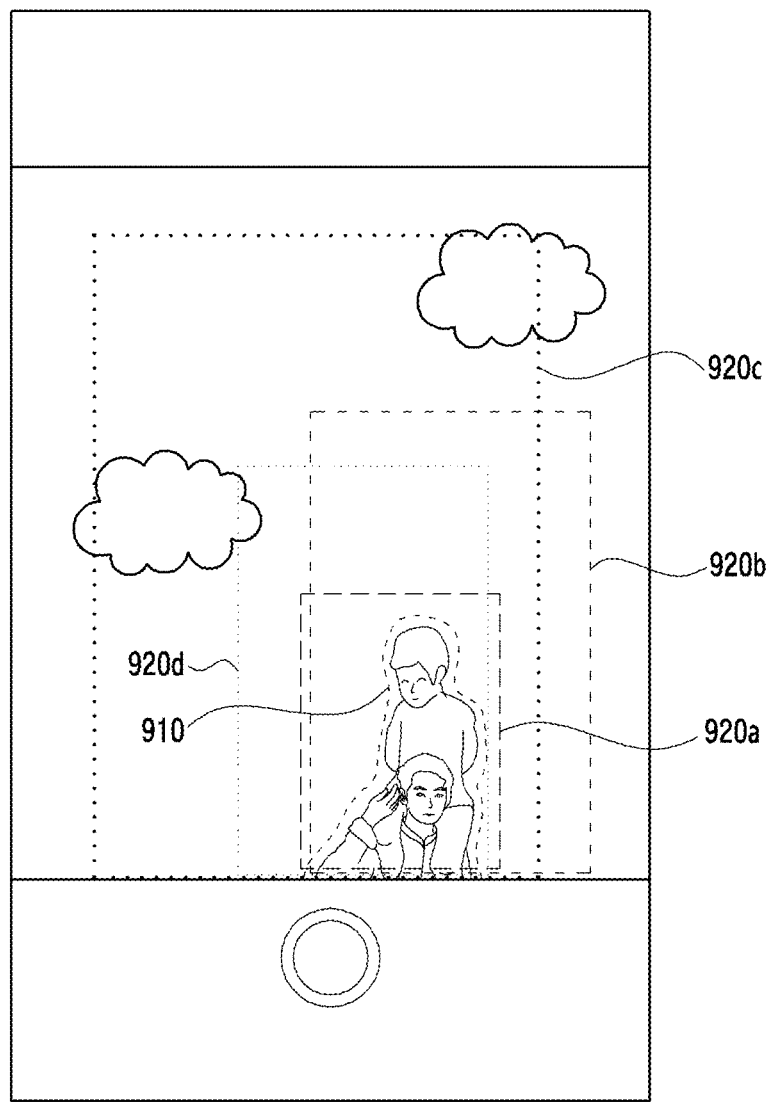
FIG. 9B illustrates an operation of an electronic device identifying a target region.

For example, referring to FIG. 9B, the processor 120 may identify a plurality of candidate target regions 920a, 920b, 920c, and 920d including an identified target 910.

In an embodiment, the processor 120 may determine aesthetic scores corresponding to the plurality of identified candidate target regions in operation 820.

In an embodiment, the processor 120 may determine aesthetic scores corresponding to the plurality of identified candidate target regions using a statistical model trained on the basis of machine learning. For example, the processor 120 may determine aesthetic scores corresponding to the plurality of identified candidate target regions using an adjustment region detection algorithm.

In an embodiment, the statistical model trained on the basis of machine learning may be trained on the basis of user data (e.g., user preference).

In an embodiment, the processor 120 may identify whether the maximum aesthetic score is a threshold value or greater in operation 830. For example, the processor 120 may identify whether the highest aesthetic score among the aesthetic scores corresponding to the plurality of candidate target regions is the threshold value or greater.

When the maximum aesthetic score is not the threshold value or greater (Yes in operation 830), the processor 120 may provide a rule-based recommended composition in operation 840. For example, the processor 120 may detect at least one of a dominant line, a vanishing point, and a salience region in the preview screen and may provide a recommended composition on the basis of detected information.

In an embodiment, the processor 120 may generate a photographic image in operation 850. For example, after providing the rule-based recommended composition, the processor 120 may generate a photographic image in response to a user input to move the electronic device 101 according to the provided recommended composition.

When the maximum aesthetic score is the threshold value or greater, the processor 120 may determine a candidate target region corresponding to the maximum aesthetic score as a target region in operation 860. For example, referring to FIG. 9B, the processor 120 may determine one candidate target region 920a among the plurality of candidate target regions 920a, 920b, 920c, and 920d as a target region.

In an embodiment, a rule-based recommended composition (operation 850) may be provided after a recommended composition based on a region according to an aesthetic score is analyzed, and a face position-based recommended composition (FIG. 6) and a whole human body position-based recommended composition (FIG. 7) may be provided before the recommended composition based on a region according to the aesthetic score is analyzed. However, this sequence is provided for illustration and is not intended to limit the scope of the disclosure, and it is obvious to those skilled in the art that the order in which the individual recommended compositions may be changed.

Figure 10:
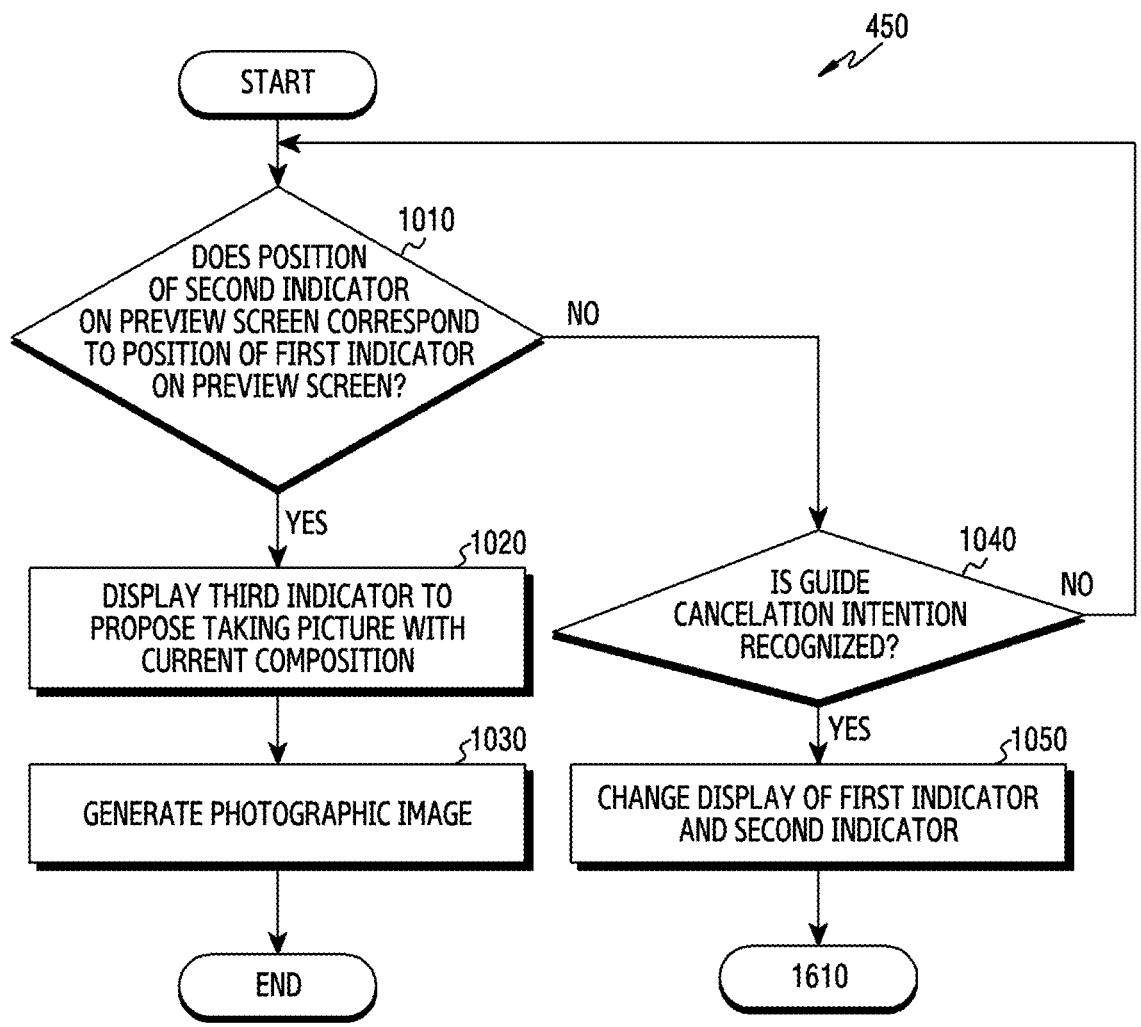
FIG. 10 is a flowchart illustrating an operation of an electronic device generating a photographic image according to various embodiments.

FIG. 10 is a flowchart illustrating an operation of an electronic device generating a photographic image according to various embodiments.

In an embodiment, at least one operation illustrated in FIG. 10 may be a detailed flowchart of operation 450 of FIG. 4.

In an embodiment, the processor 120 may identify whether the position of a second indicator on a preview screen corresponds to the position of a first indicator on the preview screen in operation 1010. For example, the processor 120 may identify whether at least a portion of the second indicator overlaps at least a portion of the first indicator.

In an embodiment, the second indicator may correspond to an identified target region and may be displayed at the center of the identified target region, and the first indicator may correspond to a specified position (e.g., the center) of the preview screen and may be displayed at the specified position on the preview screen.

Figure 11B:
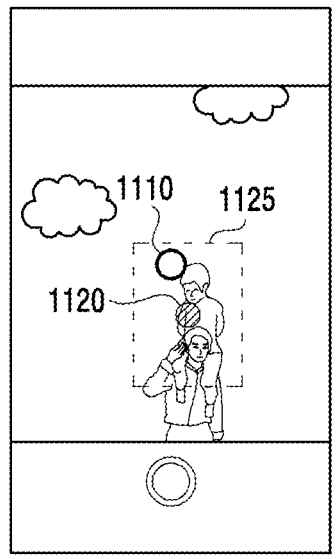
FIG. 11B illustrates an operation of an electronic device generating a photographic image according to various embodiments.

For example, referring to FIG. 11A and FIG. 11B, the processor 120 may identify that at least a portion of a second indicator 1120 corresponding to an identified target region 1125 does not overlap at least a portion of a first indicator 1110.

When the position of the second indicator on the preview screen does not correspond to the position of the first indicator on the preview screen (No in operation 1010), the processor 120 may identify whether a guide cancelation intention is recognized in operation 1040. The guide cancelation intention may indicate a user intention that a provided guide (or user interface, e.g., the first indicator and the second indicator) is unnecessary. For example, when a variance in the position of the second indicator on the preview screen is a sixth threshold value or less for a specified time, the processor 120 may determine that the guide cancelation intention is recognized.

When the guide cancelation intention is not recognized (No in operation 1040), the processor 120 may repeat operation 1010. That is, since the guide cancelation intention of a user is not recognized, the processor 120 may identify again whether the preview screen is changed according to a provided guide.

When the guide cancelation intention is recognized (Yes in operation 1040), the processor 120 may change a display of the first indicator and/or the second indicator in operation 1050. For example, the processor 120 may control the display device 160 not to display the first indicator and/or the second indicator on the preview screen anymore. In another example, the processor 120 may change display characteristics of the first indicator and/or second indicator (change the shape (e.g., from a circle to an ellipse), the size, the color, or the transparency).

In an embodiment, the processor 120 may perform operation 1610 after changing a display of the first indicator and/or the second indicator. As will be described with reference to FIG. 16, the processor 120 may determine whether the user wants to be provided with a different guide by performing an operation illustrated in FIG. 16.

When the position of the second indicator on the preview screen corresponds to the position of the first indicator on the preview screen (Yes in operation 1010), the processor 120 may display a third indicator to propose taking a picture with a current composition in operation 1020.

Figure 11C:
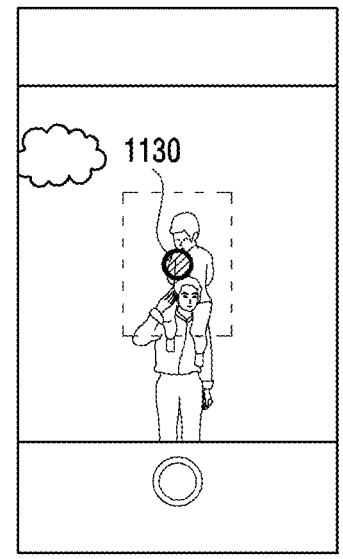
FIG. 11C illustrates an operation of an electronic device generating a photographic image according to various embodiments.

For example, referring to FIG. 11C, when at least a portion of the second indicator 1120 corresponding to the identified target region 1125 overlaps at least a portion of the first indicator 1110, the processor 120 may display the third indicator 1130 to propose taking a picture with the current composition. Similarly to the first indicator 1110, the third indicator 1130 may be displayed at a specified position of the preview screen (e.g., the center of the preview screen). The third indicator 1130 may have display characteristics equivalent or similar to those of the second indicator 1120. For example, when the first indicator 1110 is an empty circle and the second indicator 1120 is a solid circle, the third indicator 1130 may be displayed as a solid circle. The processor 120 may restrict a display of the first indicator 1110 and the second indicator 1120 at the same time that the third indicator 1130 is displayed.

In an embodiment, the processor 120 may generate a photographic image in operation 1030.

For example, the processor 120 may generate a photographic image on the basis of a user input via an icon for photographing or capturing (or in response to the user input) after displaying the third indicator.

In another example, the processor 120 may generate a photographic image independently of a user input via an icon for photographing or capturing at the same time as displaying the third indicator (or after a specified time from a display of the third indicator).

In an embodiment, the processor 120 may generate a photographic image corresponding to an image displayed on the preview screen at a specific time.

For example, after displaying the third indicator, the processor 120 may generate a photographic image corresponding to an image displayed on the preview screen at a time when a user input via an icon for photographing or capturing is received.

In another example, the processor 120 may generate a photographic image corresponding to an image displayed on the preview screen at a time when the third indicator is displayed (or at a time after a specified time from a display of the third indicator).

Figure 12:
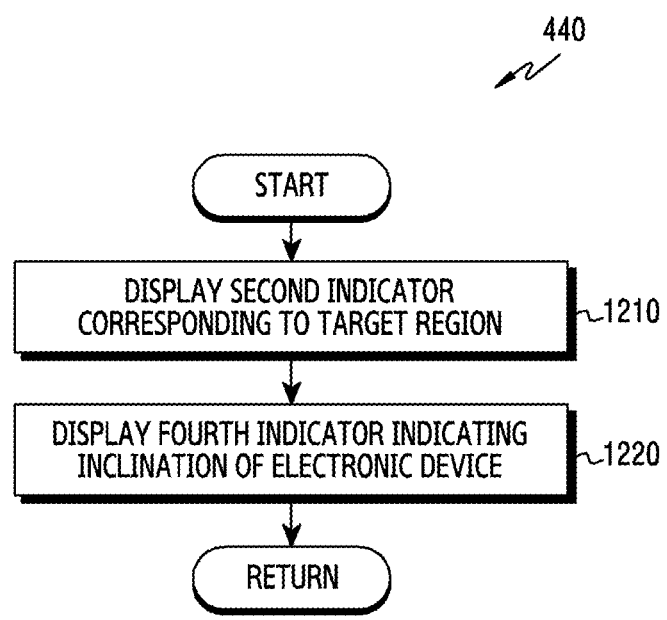
FIG. 12 is a flowchart illustrating an operation of an electronic device displaying an indicator indicating the inclination of the electronic device according to various embodiments.

FIG. 12 is a flowchart illustrating an operation of an electronic device displaying an indicator indicating the inclination of the electronic device according to various embodiments.

In an embodiment, at least one operation illustrated in FIG. 12 may be a detailed flowchart of operation 440 of FIG. 4.

In an embodiment, the processor 120 may display a second indicator corresponding to a target region in operation 1210. For example, the processor 120 may display the second indicator at the center of the target region identified in operation 430.

In an embodiment, the processor 120 may display a fourth indicator indicating the inclination of the electronic device 101 in operation 1220. In an embodiment, the processor 120 may identify the currently tilting degree of the electronic device 101 using sensing data of a rotation sensor or a gyro sensor and may display the fourth indicator according to the result of identification.

In an embodiment, operation 1210 and operation 1220 may be performed in a different order and may be performed in parallel (or substantially at the same time).

The processor may display the fourth indicator to overlap a preview screen and may display the fourth indicator adjacently to a first indicator and/or the second indicator. The processor 120 may display the fourth indicator associated with the inclination of the electronic device 101 with respect to a specified axis (e.g., the y-axis assuming that a vertical direction is the z-axis and a front is the x-axis). For example, referring to FIG. 18, when the electronic device 101 is tilted 10 degrees in the +y direction (e.g., when the electronic device 101 is rotated 10 degrees clockwise about the x-axis as an rotation axis), the processor 120 may display a fourth indicator 1440 having an angle of 10 degrees with a virtual vertical reference line 1830. The virtual vertical reference line 1830 may be a line that divides the preview screen or a display into two parts up and down, and the fourth indicator 1440 may correspond to a straight line obtained by rotating the virtual vertical reference line 1830 10 degrees counterclockwise.

According to an embodiment, the angle 1810 of the electronic device 101 tilted with respect to a specified axis and the angle 1820 between the fourth indicator 1440 and the virtual vertical reference line 1830 may be equivalent to or may correspond to each other.

Referring to FIG. 14B, the processor 120 may display a fourth indicator 1440. For example, when the electronic device 101 is tilted 10 degrees in the −y direction (e.g., when the electronic device 101 is rotated 10 degrees counterclockwise about the x-axis as an rotation axis), the processor 120 may display at least one straight line tilted 10 degrees downward at the right as the fourth indicator 1440. Here, the fourth indicator 1440 may correspond to a straight line obtained by rotating the virtual vertical reference line 10 degrees clockwise.

In another embodiment, when the electronic device 101 is not tilted in the −y direction (or +y direction) or the tilting degree of the electronic device 101 in the −y direction (or +y direction) is included within a specified range, the processor 120 may display at least one straight line having an inclination of 0 as the fourth indicator.

After displaying the fourth indicator, the processor 120 may generate a photographic image in operation 450. As described with reference to FIG. 10, the processor 120 may generate a photographic image when a condition related to the first indicator and the second indicator is satisfied (e.g., when the position of the first indicator and the position of the second indicator correspond to each other). Further, when the fourth indicator is additionally displayed as illustrated in FIG. 12, the processor 120 may generate a photographic image when the condition related to the first indicator and the second indicator and an additional condition related to the fourth indicator are satisfied.

The processor 120 may identify the current state of the electronic device related to horizontality before displaying the fourth indicator. When the current state of the electronic device corresponds to horizontality, the processor 120 may not display the fourth indicator. When the current state of the electronic device does not correspond to horizontality, the processor 120 may display the fourth indicator to guide the adjustment of the inclination of the electronic device.

Figure 13:
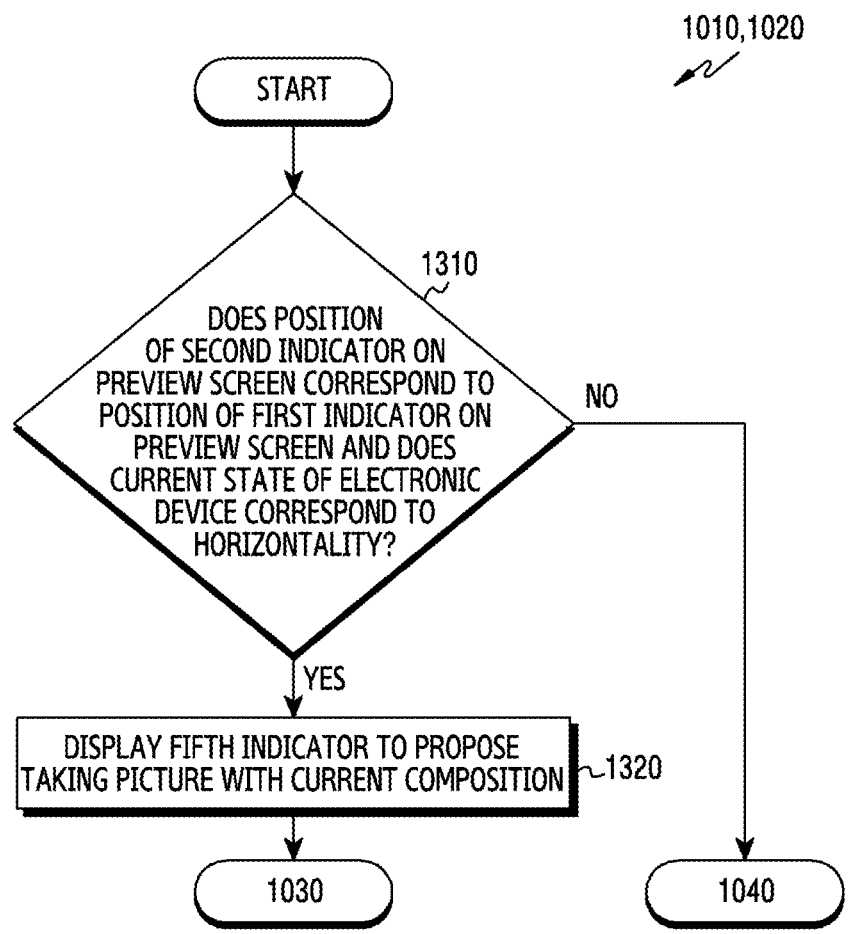
FIG. 13 is a flowchart illustrating an operation of an electronic device displaying an indicator associated with the horizontality of the electronic device according to various embodiments.
Figure 14:
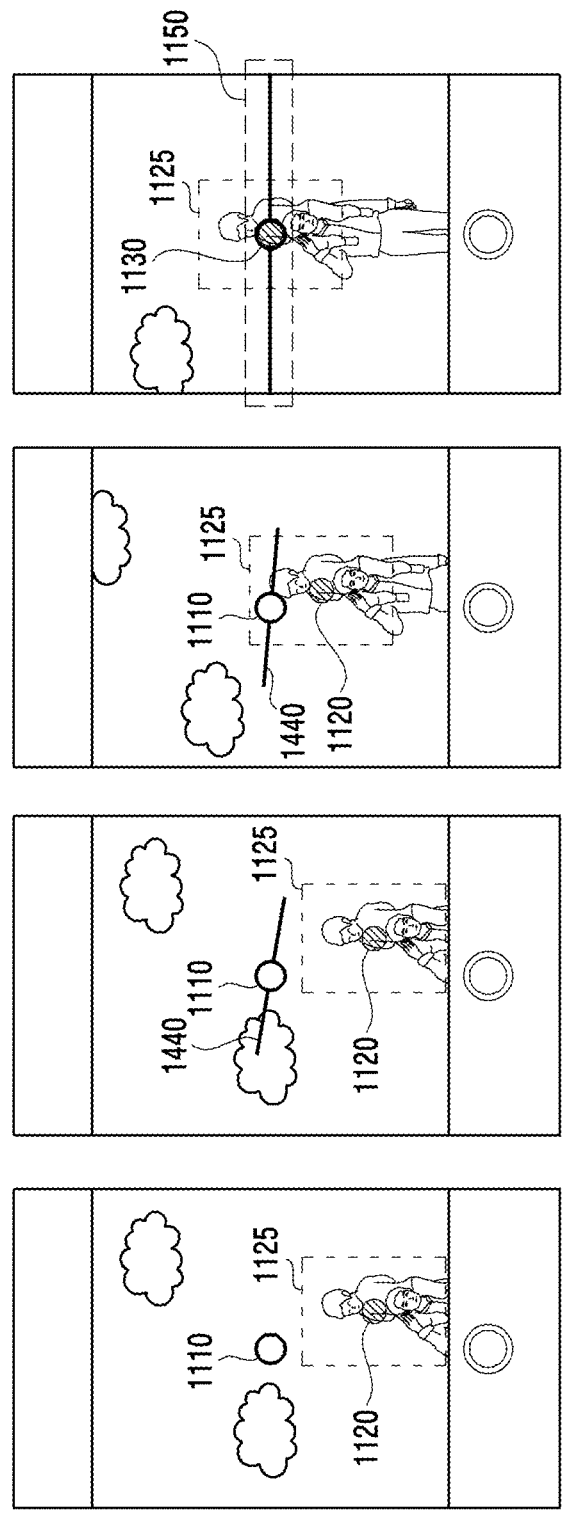
FIG. 14A illustrates an operation of an electronic device generating a photographic image according to various embodiments.
FIG. 14B illustrates an operation of an electronic device generating a photographic image according to various embodiments.
FIG. 14C illustrates an operation of an electronic device generating a photographic image according to various embodiments.
FIG. 14D illustrates an operation of an electronic device generating a photographic image according to various embodiments.

FIG. 13 is a flowchart illustrating an operation of an electronic device displaying an indicator associated with the horizontality of the electronic device according to various embodiments.

In an embodiment, at least one operation illustrated in FIG. 13 may be a detailed flowchart of operation 1010 or 1020 of FIG. 10.

In an embodiment, in operation 1310, the processor 120 may identify whether the position of a second indicator on a preview screen corresponds to the position of a first indicator on the preview screen and whether the current state of the electronic device 101 corresponds to horizontality.

In an embodiment, when the position of the second indicator on the preview screen corresponds to the position of the first indicator on the preview screen, the processor 120 may identify whether the current state of the electronic device 101 corresponds to horizontality. When the position of the second indicator on the preview screen does not correspond to the position of the first indicator on the preview screen, the processor 120 may perform operation 1040 regardless of whether the current state of the electronic device 101 corresponds to horizontality, or vice versa.

For example, referring to FIG. 14B, since the position of a second indicator 1120 on a preview screen does not correspond to the position of a first indicator 1110 on the preview screen, the processor 120 may identify whether a guide cancelation intention is recognized in operation 1040.

In another example, referring to FIG. 14C, since the position of the second indicator 1120 on the preview screen is closer to the position of the first indicator 1110 on the preview screen than in FIG. 14B but the position of the second indicator 1120 on a preview screen still does not correspond to the position of the first indicator 1110 on the preview screen, the processor 120 may identify whether a guide cancelation intention is recognized in operation 1040.

In an embodiment, the processor 120 may determine whether the current state of the electronic device 101 corresponds to horizontality on the basis of sensing data of a motion sensor (e.g., the motion sensor 360 of FIG. 3). For example, the processor 120 may determine an angle at which the electronic device 101 is inclined from a first reference axis (e.g., the vertical axis or the z-axis) to a second reference axis (e.g., the y-axis) and may determine whether the determined angle is included in an angle range corresponding to horizontality. In another example, the processor 120 may determine whether the current state of the electronic device 101 corresponds to horizontality on the basis of the angle at which a fourth indicator is inclined.

When the position of the second indicator on the preview screen corresponds to the position of the first indicator on the preview screen but the current state of the electronic device 101 does not correspond to horizontality, the processor 120 may identify whether a guide cancelation intention is recognized in operation 1040.

When the position of the second indicator on the preview screen corresponds to the position of the first indicator on the preview screen but the current state of the electronic device 101 corresponds to horizontality (Yes in operation 1310), the processor 120 may display a fifth indicator to propose taking a picture with a current composition in operation 1320. The fifth indicator may be a combination of a third indicator and an additional indicator. For example, the fifth indicator may include the third indicator and a straight line having an inclination of 0. By displaying the fifth indicator, the processor 120 may report to a user that the current composition corresponds to a recommended composition and the current state of the electronic device 101 corresponds to horizontality, and thus it is an appropriate timing to take a photographic image.

For example, referring to FIG. 14D, the processor 120 may display a fifth indicator 1150 proposing to take a picture with the current composition. The fifth indicator 1150 may include the third indicator 1130 and a straight line having an inclination of 0. The third indicator 1130 may indicate that the position of the first indicator 1110 on the preview screen corresponds to the position of the second indicator 1120 on the preview screen, and the straight line having an inclination of 0 may indicate that the current state of the electronic device 101 corresponds to horizontality.

Figure 15:
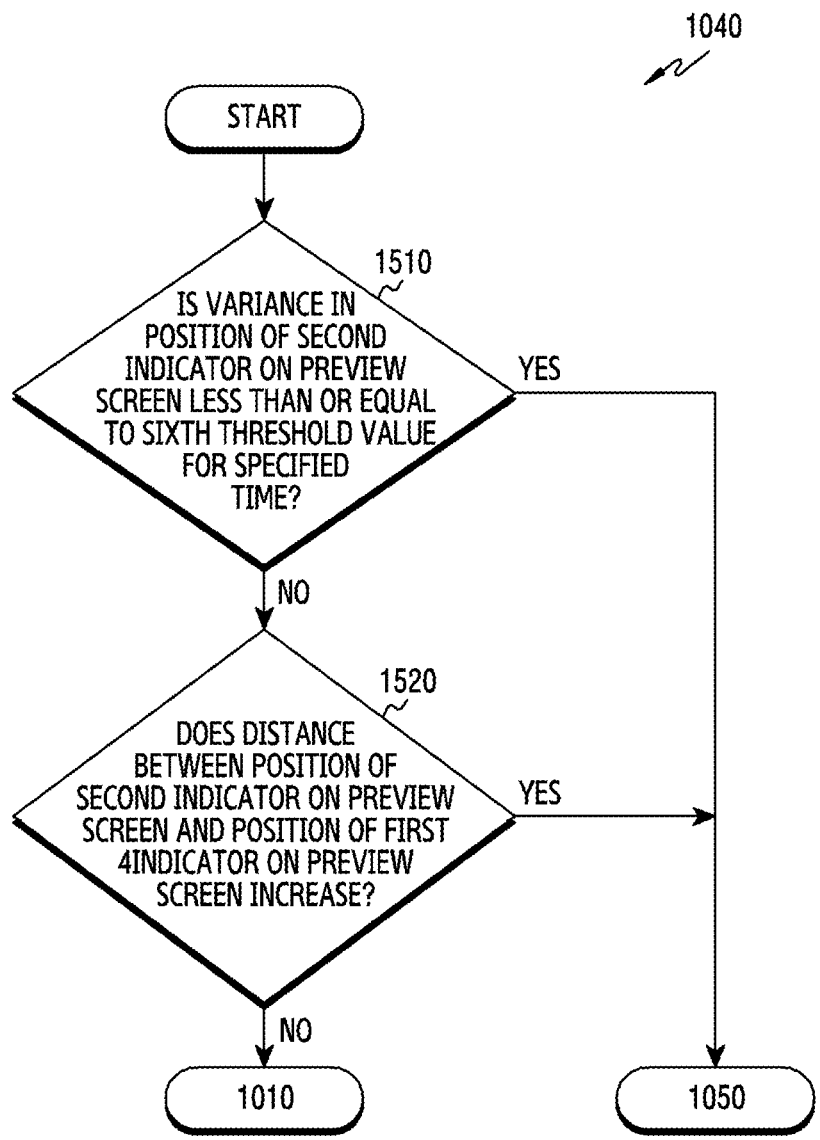
FIG. 15 is a flowchart illustrating an operation of an electronic device determining whether a guide cancelation intention is recognized according to various embodiments.

FIG. 15 is a flowchart illustrating an operation of an electronic device determining whether a guide cancelation intention is recognized according to various embodiments.

In an embodiment, at least one operation illustrated in FIG. 15 may be a detailed flowchart of operation 1040 of FIG. 10.

In an embodiment, in operation 1510, the processor 120 may identify whether a variance in the position of a second indicator on a preview screen is a sixth threshold value or less for a specified time.

When the variance in the position of the second indicator on the preview screen is the sixth threshold value or less for the specified time (Yes in operation 1510), the processor 120 may perform operation 1050. That is, the processor 120 may determine that a user intention to change a composition according to a provided guide (e.g., a first indicator and a second indicator) is not recognized. Alternatively, the processor 120 may determine that a user intention to cancel the provided guide is recognized.

When the variance in the position of the second indicator on the preview screen exceeds the sixth threshold value for the specified time (No in operation 1510), the processor 120 may identify whether the distance between the position of the second indicator on the preview screen and the position of the first indicator on the preview screen increases in operation 1520. For example, the processor 120 may determine whether the second indicator is no longer displayed on the preview screen as the position of the second indicator on the preview screen becomes distant from the position of the first indicator on the preview screen.

When the distance between the position of the second indicator on the preview screen and the position of the first indicator on the preview screen increases (Yes in operation 1520), the processor 120 may perform operation 1050. That is, the processor 120 may determine that a user intention to change a composition according to a provided guide (e.g., the first indicator and the second indicator) is not recognized. Alternatively, the processor 120 may determine that a user intention to cancel the provided guide is recognized.

When the distance between the position of the second indicator on the preview screen and the position of the first indicator on the preview screen increases and accordingly the second indicator is no longer displayed on the preview screen, the processor 120 may perform operation 1050. Alternatively, when the second indicator is not displayed on the preview screen for a certain time (target loss), the processor 120 may perform operation 1050.

When the distance between the position of the second indicator on the preview screen and the position of the first indicator on the preview screen does not increase (No in operation 1520), the processor 120 may repeat operation 1010. That is, the processor 120 may determine that a user intention to cancel the provided guide is not recognized and may then identify again whether the position of the second indicator on the preview screen corresponds to the position of the first indicator on the preview screen.

Figure 16:
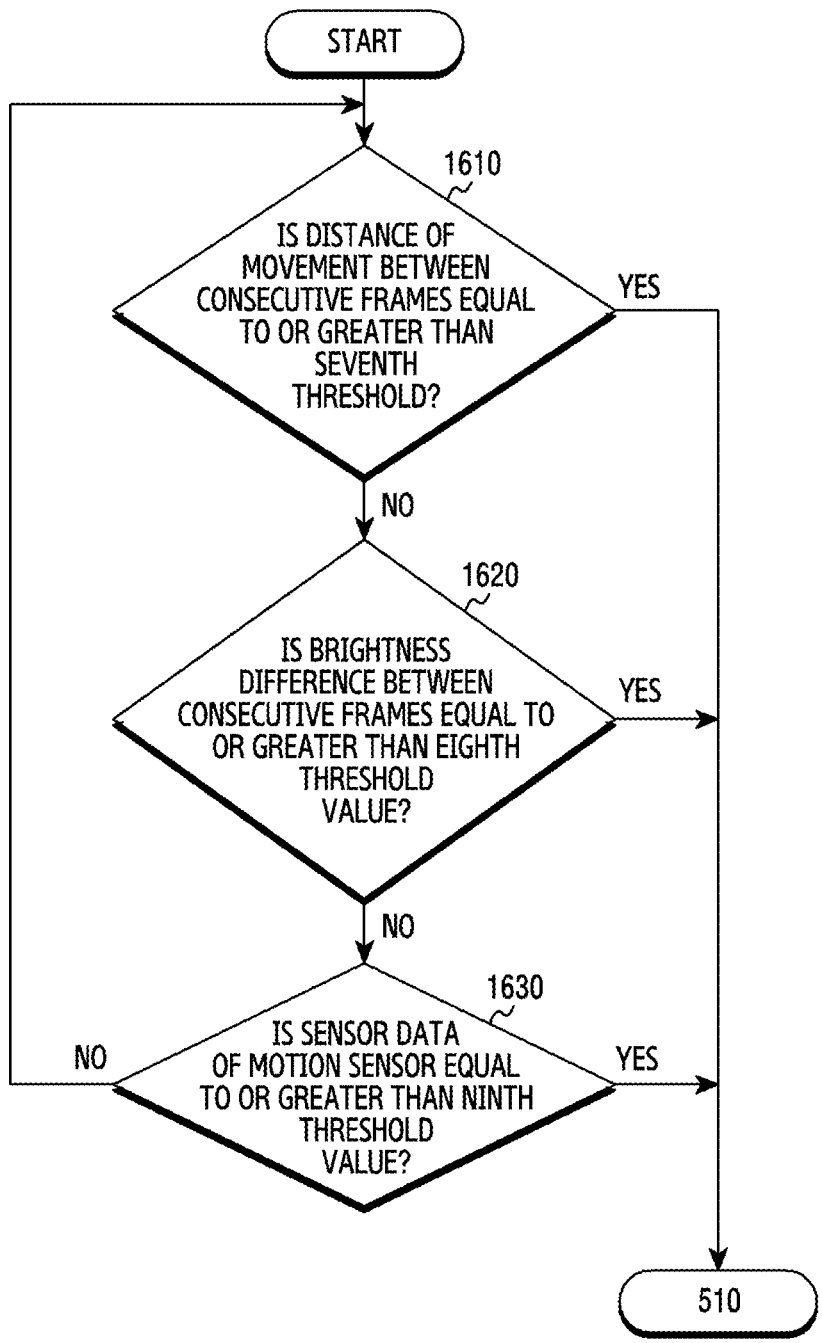
FIG. 16 is a flowchart illustrating an operation of an electronic device providing a recommended composition guide again according to various embodiments.

FIG. 16 is a flowchart illustrating an operation of an electronic device providing a recommended composition guide again according to various embodiments.

In an embodiment, at least one operation illustrated in FIG. 16 may be performed after operation 1050 of FIG. 10 is performed.

At least one operation illustrated in FIG. 16 may be performed after operation 1030 of FIG. 10 is performed.

In an embodiment, in operation 1610, the processor 120 may identify whether the distance of a movement between consecutive frames is a seventh threshold or greater. For example, the processor 120 may identify whether the distance of a movement between consecutive frames is the seventh threshold or greater on the basis of the position of the same specific object displayed on consecutive images among a plurality of image frames obtained by a camera module (e.g., the camera module 180). In another example, the processor 120 may identify whether the distance of a movement between consecutive frames is the seventh threshold or greater by tracking a specific region (e.g., a central region) in the consecutive image frames.

In an embodiment, in operation 1620, the processor 120 may identify whether the brightness difference between consecutive frames is an eighth threshold value or greater. In an embodiment, the consecutive frames identified in operation 1620 may be the same as the consecutive frames identified in operation 1610 or may be frames subsequent to the consecutive frames identified in operation 1610.

In an embodiment, in operation 1630, the processor 120 may identify whether sensor data of a motion sensor is a ninth threshold value or greater. In an embodiment, the motion sensor may be an acceleration sensor, and the sensor data of the motion sensor may be sensor data related to movement or acceleration information about the electronic device 101.

When the distance of the movement between the consecutive frames is less than the seventh threshold (No in operation 1610), the brightness difference between the consecutive frames is less than eighth threshold value (No in operation 1620), and the sensor data of the motion sensor is less than the ninth threshold (No in operation 1630), the processor 120 may repeat operation 1610. When any one of the three conditions (in 1610 to 1630) is satisfied, the processor 120 may determine that a user wants to be provided with a different guide and may perform operation 510. That is, the processor 120 may perform the operations illustrated in FIG. 16 in order to prevent inconvenience incurred to the user when providing a guide not intended by f the user.

When any one of the three conditions (in 1610 to 1630) is not satisfied, the processor 120 may terminate a corresponding algorithm or may deactivate an activated camera application instead of repeating operation 1610.

FIG. 17 illustrates an operation of an electronic device generating a photographic image, according to various embodiments.

Figure 17A:
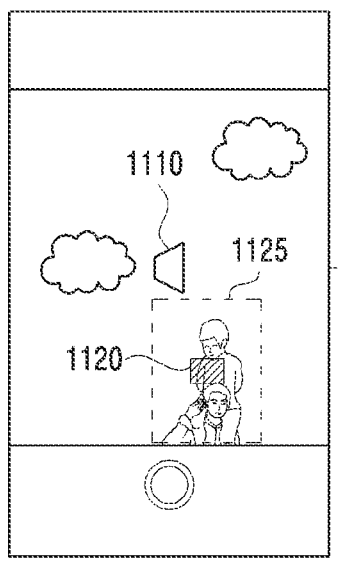
FIG. 17A, FIG. 17B, and FIG. 17C illustrate operations of an electronic device generating a photographic image, according to various embodiments.
Figure 17B:
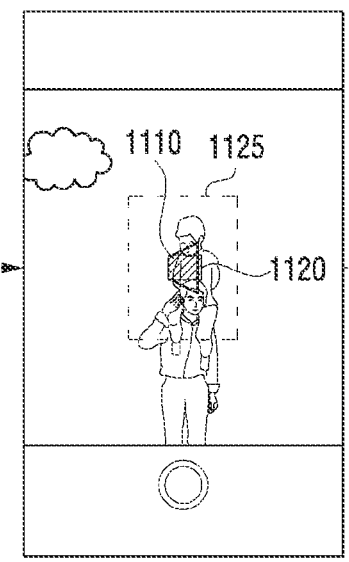
Figure 17C:
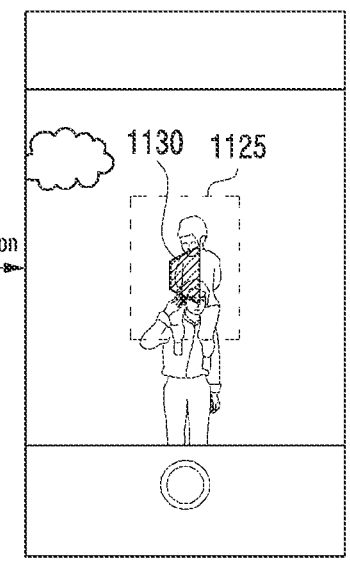
Figure 18:
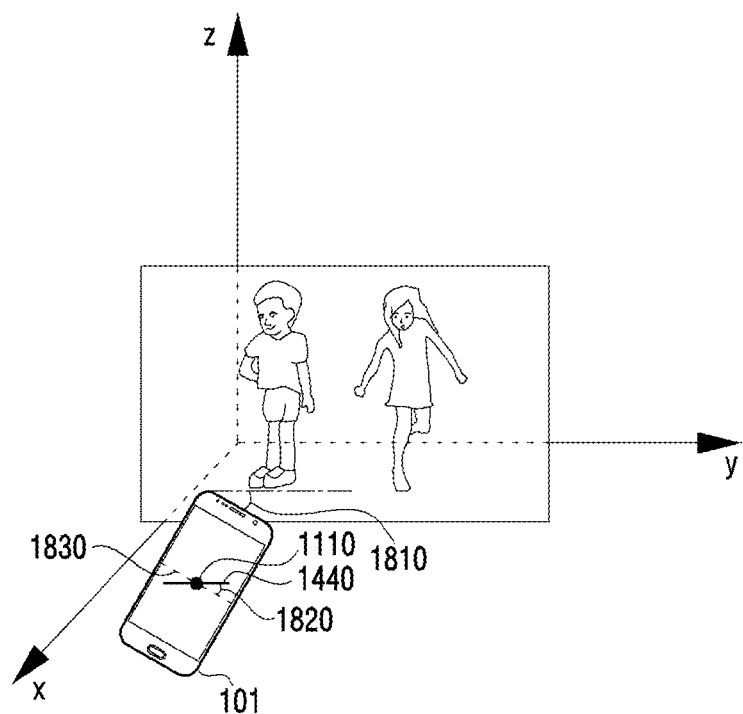
FIG. 18 illustrates an operation of an electronic device displaying an indicator associated with the horizontality of the electronic device according to various embodiments.

Referring to FIG. 17A, the processor 120 may display a first indicator 1110 corresponding to the center position of a preview screen and a second indicator 1120 corresponding to the center position of a target region 1125 to overlap the preview screen.

In an embodiment, the processor 120 may display the second indicator 1120 in a quadrangular form.

In an embodiment, the processor 120 may display the first indicator 1110 in a trapezoidal form.

In an embodiment, the processor 120 may identify whether the position of the first indicator 1110 on the preview screen corresponds to the position of the second indicator 1120 on the preview screen. For example, referring to FIG. 17B, the processor 120 may identify that an overlapping region of the first indicator 1110 and the second indicator 1120 falls in a specified range (e.g., a first specified range).

In an embodiment, the shape of the second indicator 1120 may be changed according to the rotation of the electronic device 101. For example, according to the rotation of the electronic device 101 in terms of pitch, the shape of the second indicator 1120 may be changed from a rectangle to a trapezoid in which upper and lower side are parallel to each other. In another example, according to the rotation of the electronic device 101 in terms of yaw, the shape of the second indicator 1120 may be changed from a rectangle to a trapezoid in which left and right sides are parallel to each other.

In an embodiment, the processor 120 may detect the rotation of the electronic device 101. The processor 120 may detect the rotation of the electronic device 101 in a specified direction. The specified direction may be inferred from the form of the first indicator 1110 and the form of the second indicator 1120 at a time when the first indicator 1110 and the second indicator 1120 correspond to each other. For example, referring to FIG. 17B, the second indicator 1120 may correspond to a current form of the electronic device 101, and the first indicator 1110 may correspond to a recommended form of the electronic device 101.

In an embodiment, the processor 120 may detect the rotation of the electronic device 101 on the basis of sensor data of a motion sensor. In an embodiment, when the first indicator 1110 is a parallelogram having right and left sides parallel to each other, the processor 120 may detect the rotation of the electronic device in terms of yaw. When the first indicator 1110 is a parallelogram in which right and left sides are parallel to each other and the right side is longer, the processor 120 may detect the rotation of the electronic device 101 in a clockwise direction when viewed in the +z direction.

The processor 120 may detect the rotation of the electronic device 101 on the basis of sensor data of a motion sensor. In an embodiment, when the first indicator 1110 is a parallelogram having upper and lower sides parallel to each other, the processor 120 may detect the rotation of the electronic device in terms of pitch. When the first indicator 1110 is a parallelogram in which upper and lower sides are parallel to each other and the lower side is longer, the processor 120 may detect the rotation of the electronic device 101 in a clockwise direction when viewed in the +y direction.

In an embodiment, the processor 120 may detect the rotation of the electronic device 101 by a specified angle in a specified direction.

In an embodiment, the processor 120 may display a separate object for guiding the rotation of the electronic device 101 before detecting the rotation of the electronic device 101. For example, the processor 120 may display a visual object indicating at least one of the specified direction and the specified angle to overlap the preview screen.

In an embodiment, the processor 120 may display a third indicator 1130 when the overlapping region of the first indicator 1110 and the second indicator 1120 falls in a specified range (e.g., a second specified range greater than the first specified range). For example, referring to FIG. 17C, the processor 120 may display the third indicator 1130 when the rotation of the electronic device 101 by the specified angle in the specified direction is detected. The display position and the display form of the third indicator 1130 may correspond to the display position (center of the preview screen) and the display form (trapezoid) of the first indicator 1110. A display characteristic (e.g., color) of the third indicator 1130 may correspond to a display characteristic of the second indicator 1120.

According to the embodiment illustrated in FIG. 17, the electronic device 101 may specifically provide a recommended composition to a user. The electronic device 101 may guide not only a movement of the electronic device 101 in at least one of upward, downward, leftward, and rightward directions but also the rotation of the electronic device in a specified direction, such as panning, in order to take a picture with an optimal composition.

The computer-readable storage medium may include a hard disk, a floppy disk, a magnetic medium (e.g., a magnetic tape), an Optical Media (e.g., CD-ROM, DVD), a Magneto-Optical Media (e.g., a floptical disk), an inner memory, etc. The instruction may include a code made by a complier or a code that can be executed by an interpreter. The programming module according to the disclosure may include one or more of the aforementioned components or may further include other additional components, or some of the aforementioned components may be omitted. Operations performed by a module, a programming module, or other elements according to various embodiments may be executed sequentially, in parallel, repeatedly, or in a heuristic manner. At least some operations may be executed according to another sequence, may be omitted, or may further include other operations.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
a display device;
an image sensor configured to capture an image of an object; and
a processor configured to be operatively connected to the display device and the image sensor,
wherein the processor is configured to:
display a first indicator at a specified position within a preview screen of the image displayed on the display device;
identify a target on the preview screen;
identify a target region corresponding to the identified target among a plurality of candidate target regions comprising the identified target based on a number of aesthetic scores assigned to the plurality of candidate target regions;
display a second indicator corresponding to the identified target region on the preview screen; and
when the second indicator is moved to the specified position, generate a photographic image corresponding to the preview screen at a specified time.

2. The electronic device of claim 1, wherein the plurality of candidate target regions has at least one of: different sizes or different aspect ratios.

3. The electronic device of claim 1, wherein to generate the photographic image, the processor is configured to generate the photographic image corresponding to the preview screen displayed on the display device at the specified time, the specified time being a time at which the second indicator is moved to the specified position.

4. The electronic device of claim 1, wherein to generate the photographic image, the processor is configured to generate the photographic image corresponding to the preview screen displayed on the display device at the specified time, the specified time being a time at which a user input to generate a photographic image is received after the second indicator is moved to the specified position.

5. The electronic device of claim 1, wherein the processor is further configured to:
identify whether the second indicator is moved to the specified position; and
identify whether a guide cancelation intention is recognized when the second indicator is not moved to the specified position.

6. The electronic device of claim 5, wherein the processor is further configured to display a third indicator to propose taking a picture with a current composition on the preview screen when the second indicator is moved to the specified position.

7. The electronic device of claim 5, wherein the processor is further configured to:
identify whether the electronic device is rotated by a specified angle in a specified direction when the second indicator is moved to the specified position, the specified direction being determined according to a form of the first indicator and a form of the second indicator; and display a third indicator to propose taking a picture with a current composition on the preview screen when the electronic device is rotated by the specified angle in the specified direction.

8. The electronic device of claim 5, wherein the processor is further configured to identify whether a movement of the electronic device corresponding to a user intention to request a provision of a different guide for a recommended composition is detected when the guide cancelation intention is recognized.

9. The electronic device of claim 1, wherein the processor is further configured to:
display a fourth indicator associated with a horizontal state of the electronic device on the preview screen; and
to generate the photographic image, when the second indicator is moved to the specified position and a current state of the electronic device corresponds to the horizontal state, the processor is configured to generate the photographic image corresponding to the preview screen at the specified time.

10. The electronic device of claim 1, wherein to identify the target region, the processor is configured to:
identify whether a maximum aesthetic score among the number of aesthetic scores assigned to the plurality of candidate target regions is a threshold value or greater;
determine a candidate target region corresponding to the maximum aesthetic score as the target region when the maximum aesthetic score is the threshold value or greater; and
provide a predetermined rule-based recommended composition when the maximum aesthetic score is less than the threshold value,
wherein to provide the predetermined rule-based recommended composition, the processor is configured to detect at least one piece of information about a dominant line, a vanishing point, and a salience region in the preview screen and provide the predetermined rule-based recommended composition based on the detected at least one piece of information.

11. An operating method of an electronic device comprising an image sensor and a display device, the operating method comprising:
displaying a first indicator at a specified position within a preview screen of an image displayed on the display device;
identifying a target on the preview screen;
identifying a target region corresponding to the identified target among a plurality of candidate target regions comprising the identified target based on a number of aesthetic scores assigned to the plurality of candidate target regions;
displaying a second indicator corresponding to the identified target region on the preview screen; and
when the second indicator is moved to the specified position, generating a photographic image corresponding to the preview screen at a specified time.

12. The operating method of claim 11, wherein the plurality of candidate target regions has at least one of: different sizes or different aspect ratios.

13. The operating method of claim 11, wherein the generating of the photographic image comprises: generating the photographic image corresponding to the preview screen displayed on the display device at the specified time, the specified time being a time at which the second indicator is moved to the specified position.

14. The operating method of claim 11, wherein the generating of the photographic image comprises: generating the photographic image corresponding to the preview screen displayed on the display device at the specified time, the specified time being a time at which a user input to generate a photographic image is received after the second indicator is moved to the specified position.

15. The operating method of claim 11, further comprising:
identifying whether the second indicator is moved to the specified position; and
identifying whether a guide cancelation intention is recognized when the second indicator is not moved to the specified position.

16. The operating method of claim 15, further comprising displaying a third indicator to propose taking a picture with a current composition on the preview screen when the second indicator is moved to the specified position.

17. The operating method of claim 15, further comprising:
identifying whether the electronic device is rotated by a specified angle in a specified direction when the second indicator is moved to the specified position, the specified direction being determined according to a form of the first indicator and a form of the second indicator; and
displaying a third indicator to propose taking a picture with a current composition on the preview screen when the electronic device is rotated by the specified angle in the specified direction.

18. The operating method of claim 15, wherein further comprising identifying whether a movement of the electronic device corresponding to a user intention to request a provision of a different guide for a recommended composition is detected when the guide cancelation intention is recognized.

19. The operating method of claim 11, further comprising displaying a fourth indicator associated with a horizontal state of the electronic device on the preview screen,
wherein the generating of the photographic image comprises, when the second indicator is moved to the specified position and a current state of the electronic device corresponds to the horizontal state, generating the photographic image corresponding to the preview screen at the specified time.

20. The operating method of claim 11, wherein the identifying of the target region comprises:
identifying whether a maximum aesthetic score among the number of aesthetic scores assigned to the plurality of candidate target regions is a threshold value or greater;
determining a candidate target region corresponding to the maximum aesthetic score as the target region when the maximum aesthetic score is the threshold value or greater; and
providing a predetermined rule-based recommended composition when the maximum aesthetic score is less than the threshold value,
wherein providing of the predetermined rule-based recommended composition comprises detecting at least one piece of information about a dominant line, a vanishing point, and a salience region in the preview screen and providing the predetermined rule-based recommended composition based on the detected at least one piece of information.

* * * * *